(12) United States Patent
Chen

(10) Patent No.: US 9,602,603 B2
(45) Date of Patent: Mar. 21, 2017

(54) REGISTRATION AND CONNECTION METHOD FOR A CAR APPARATUS AND A MOBILE APPARATUS

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 296 days.

(21) Appl. No.: 14/263,334

(22) Filed: Apr. 28, 2014

(65) Prior Publication Data

US 2015/0312346 A1  Oct. 29, 2015

(51) Int. Cl.
*H04L 29/08* (2006.01)
*H04L 12/24* (2006.01)
*H04W 4/04* (2009.01)

(52) U.S. Cl.
CPC ............ *H04L 67/12* (2013.01); *H04L 41/046* (2013.01); *H04W 4/046* (2013.01)

(58) Field of Classification Search
CPC ....... H04L 67/12; H04L 41/046; H04W 4/046
See application file for complete search history.

(56) References Cited

U.S. PATENT DOCUMENTS

| | | | | |
|---|---|---|---|---|
| 9,003,500 | B2* | 4/2015 | Oglesbee | H04L 67/1095 726/5 |
| 2001/0029478 | A1* | 10/2001 | Laster | G06Q 30/08 705/37 |
| 2004/0093299 | A1* | 5/2004 | Bodin | G06Q 30/02 705/37 |
| 2006/0052086 | A1* | 3/2006 | Funato | G06Q 10/063 455/411 |
| 2006/0086796 | A1* | 4/2006 | Onogi | G06K 7/10712 235/454 |
| 2007/0162550 | A1* | 7/2007 | Rosenberg | H04L 12/581 709/206 |
| 2007/0279200 | A1* | 12/2007 | Morimoto | G06Q 50/10 340/436 |
| 2010/0037057 | A1* | 2/2010 | Shim | H04L 63/0823 709/203 |
| 2015/0024686 | A1* | 1/2015 | Hrabak | H04W 4/008 455/41.2 |

* cited by examiner

*Primary Examiner* — Hamza Algibhah
(74) *Attorney, Agent, or Firm* — Guice Patents PLLC

(57) ABSTRACT

A registration and connection method for a car apparatus and a mobile apparatus includes registering a car apparatus, registering a third mobile apparatus, and connecting the car apparatus to the third mobile apparatus. By the method, the functions of the mobile apparatus can be used freely, and the car apparatus is managed by an agency. After pairing the two apparatuses, the functions of the car apparatus and the mobile apparatus can be combined, thereby setting up a connection channel among the agency, the car apparatus and the mobile apparatus that pairs with the car apparatus.

14 Claims, 12 Drawing Sheets

REGISTRATION AND CONNECTION METHOD FOR A CAR APPARATUS AND A MOBILE APPARATUS

BACKGROUND OF THE INVENTION a) Field of the Invention

The present invention relates to a registration and connection method for a car apparatus and a mobile apparatus, and more particularly to a registration and connection method by which the functions of the car apparatus and the mobile apparatus can be combined that the mobile apparatus can be used freely, the car apparatus can be managed by an agency (can be an auto dealer), the functions of the car apparatus and the mobile apparatus can be combined after pairing the two apparatuses, and a notice or an advertisement of the agency (can be an auto dealer) can be displayed on the car apparatus and the mobile apparatus.

b) Description of the Prior Art

As the prevalence of smart phones, BLUETOOTH or Wi-Fi (wireless technology standard) is often used as a connection interface to connect an on-board host (or car apparatus) with the smart phone, acting as hands-free or playing music.

Due to the flourishing of wireless networks and mobile apparatuses, it has been very common to install a dedicated application on a smart phone to increase functions or to connect with other apparatuses. In addition, a dedicated application for connecting the car apparatus to the smart phone is also developed, allowing a registered auto dealer to transmit an advertisement or a message of notification to a registered car apparatus and a mobile apparatus which pairs with the car apparatus.

Accordingly, the car communication is used widely, and related technologies can be referred to in the patents of TW 1260132, TW 11375453, TW 11378222, TW M455303, TW M455307 and TW Publication No. 201335846A1, wherein the most typical technology is the Taiwanese Patent Publication No. 201335846A1 (as shown in FIG. 1). This prior art discloses a method, handheld electronic apparatus and car system for activating an application. In the method for activating the application, when the handheld electronic apparatus is connected to the car apparatus (step S205), the handheld electronic apparatus obtains identification information from the car apparatus (step S210). The car apparatus is coupled to a power connection unit of the car. After obtaining the identification information, the handheld electronic apparatus automatically activates an application corresponding to the identification information (step S215). The prior art can increase the applicability of electronic products. However, it cannot provide the management of the auto dealer through a registration mechanism, nor can transmit the identification information to a network server. Therefore, the car apparatus and the mobile apparatus cannot be combined together, allowing the notice or advertisement of the agency auto dealer to be displayed on the car apparatus and the mobile apparatus after pairing the two apparatuses, which results in that a car owner will not be able to receive some important messages, such as a notice of periodical maintenance, a special discount notice or an emergency notice of recall due to a defect in the car manufacturer, when necessary.

SUMMARY OF THE INVENTION

Accordingly, the primary object of the present invention is to provide a registration and connection method for a car apparatus and a mobile apparatus, such that by combining the functions of the car apparatus and the mobile apparatus, the notice or advertisement of the agency (can be an auto dealer) is able to be displayed on the car apparatus and the mobile apparatus.

To achieve the aforementioned object, a first embodiment of the registration and connection method for the car apparatus and the mobile apparatus includes following steps:

(1) Registration of a car apparatus
   a. A first agency (can be an auto dealer) applies for a first agency (can be an auto dealer) account from a network server. After confirmation and approval by the network server, a first agency (can be an auto dealer) webpage can be opened on a website of the network server using the first agency (can be an auto dealer) account to input the basic information and the registration data of plural car apparatuses of the first agency (can be an auto dealer).
   b. The registration data of the car apparatus is inputted on the first agency (can be an auto dealer) webpage of the network server of the first agency (can be an auto dealer). The registration data includes at least a serial number and a plate number of the car apparatus. The registration data of the car apparatus is then transmitted to the network server.

(2) Registration of a third mobile apparatus
   A user dedicated application is installed on a third mobile apparatus, the basic information of the third mobile apparatus is inputted and then uploaded to the network server. A message is transmitted to the third mobile apparatus from the network server, and the user dedicated application on the third mobile apparatus can be used after confirming the message by the third mobile apparatus.

(3) Connecting the car apparatus to the third mobile apparatus
   a. A car dedicated application is installed on the car apparatus. After pairing the third mobile apparatus with the car apparatus using BLUETOOTH wireless technology standard, the basic information of the third mobile apparatus and the car apparatus will be transmitted to each other; the third mobile apparatus will obtain the basic information of the car apparatus and the car apparatus will obtain the basic information of the third mobile apparatus.
   b. After obtaining the basic information of the third mobile apparatus, the car apparatus will transmit the basic information of the third mobile apparatus and the car apparatus to the network server. The network server will synchronize the data of the third mobile apparatus with that of the car apparatus, and convert the use right of the car dedicated application.

The abovementioned step of registering the car apparatus further includes a step of changing the agency (can be an auto dealer), comprising that:

(1) A second agency (can be an auto dealer) applies for a second agency (can be an auto dealer) account from a network server. After confirmation and approval by the network server, a second agency (can be an auto dealer) webpage can be opened on the website of the network server using the second agency (can be an auto dealer) account to input the basic information and the registration data of plural car apparatuses of the second agency (can be an auto dealer).

(2) The second agency (can be an auto dealer) inputs the registration data of the car apparatus on the second agency (can be an auto dealer) webpage, and transmits the registration data of the car apparatus to the network server.

(3) The network server will compare the registration data. The network server queries whether a new agency (can be an auto dealer) is logged in, and a screen of the car apparatus will display the pages of the first agency (can be an auto dealer) and the second agency (can be an auto dealer). The car owner can remove the second agency (can be an auto dealer), and the car apparatus will notify the first agency (can be an auto dealer) to display on the first agency (can be an auto dealer) webpage that the car owner is to remove the first agency (can be an auto dealer) and change to the second agency (can be an auto dealer). If the first agency (can be an auto dealer) clicks to agree or does not respond in one month, then the first agency (can be an auto dealer) will be replaced by the second agency (can be an auto dealer).

The abovementioned first agency (can be an auto dealer) and second agency (can be an auto dealer) can transmit an advertisement or a message of notification to the car apparatus and the third mobile apparatus.

The abovementioned network server will push note a message to the first agency (can be an auto dealer) or the second agency (can be an auto dealer), the car apparatus, and the first and third mobile apparatuses, when the car apparatus reaches a specified time period.

The abovementioned step of connecting the car apparatus to the third mobile apparatus further includes a step of withdrawing the third mobile apparatus from the connection. When the third mobile apparatus is disconnected and the user dedicated application is activated, the settings and dialog records when the third mobile apparatus is connected to the car apparatus will be downloaded to the third mobile apparatus.

The abovementioned step of connecting the car apparatus with the third mobile apparatus further includes a step of updating the version of the car apparatus. The user dedicated application will remember the basic information that pairs with the car apparatus, and when the third mobile apparatus activates the user dedicated application, the third mobile apparatus will return the basic information of the car apparatus. The network server will check whether the basic information of the car apparatus needs to be updated; if the update is required, the network server will push note a download message.

The abovementioned third mobile apparatus can pair with plural car apparatuses, and the car apparatus can pair with plural third mobile apparatuses.

The abovementioned step of registering the car apparatus further includes a step of comparing the plate number. The plate number comparison step comprises that:

(1) The network server will compare the plate number of the registration data. If the plate number is new, then the agency (can be an auto dealer) dedicated application will query whether a new subscriber is logged in. A new account will be opened if the answer is "yes," and the account will record the registration data. On the other hand, if the answer is "no," then a message of "please confirm the plate number" is responded and the application ends.

(2) If the plate number has been logged in already, then a UUID (Universal Unique Identifier) of the registration data is compared. If the comparison is true, then the time stamp of data will be compared and the difference will be synchronized. On the other hand, if the UUID is different, then the application will query "do you want to change to a new car apparatus?" If the answer is "yes," then it means that a new car apparatus is to be used and all the data will be synchronized. However, no data updating will be done while setting up the car apparatus. On the other hand, if the answer is "no," then a message of "please confirm the plate number and the serial number of the car apparatus" will be responded.

A second embodiment of the registration and connection method for the car apparatus and the mobile apparatus, according to the present invention, comprises following steps:

(1) Registration of a car apparatus
  a. A first agency (can be an auto dealer) applies for a first agency (can be an auto dealer) account from a network server. After confirmation and approval by the network server, a first agency (can be an auto dealer) webpage can be opened on a website of the network server using the first agency (can be an auto dealer) account to input the basic information of the first agency (can be an auto dealer), at least the data of one first service personnel and the registration data of plural car apparatuses.
  b. An agency (can be an auto dealer) dedicated application is installed on a first mobile apparatus. The basic information of the first service personnel are inputted and uploaded to the first agency (can be an auto dealer) webpage. After confirmation and approval by the first agency (can be an auto dealer) webpage, the first agency (can be an auto dealer) webpage will transmit a first activation message to the first mobile apparatus, and then the first mobile apparatus can use the agency (can be an auto dealer) dedicated application which includes a QR (Quick Response) code reader.
  c. The first service personnel uses the QR code reader in the agency (can be an auto dealer) dedicated application of the first mobile apparatus to read the QR code of the car apparatus, and then a plate number field will appear. After inputting a plate number by the first service personnel, the registration data of the car apparatus will be transmitted to the network server.

(2) To register the third mobile apparatus, a user dedicated application is installed on the third mobile apparatus, and the basic information of the third mobile apparatus are inputted. The basic information of the third mobile apparatus will be uploaded to the network server, and the network server will transmit a message to the third mobile apparatus. After confirming the message, the third mobile apparatus can use the user dedicated application.

(3) The step of connecting the car apparatus to the third mobile apparatus includes that:
  a. A car dedicated application is installed on the car apparatus. After the third mobile apparatus has paired with the car apparatus using BLUETOOTH wireless technology standard, the basic information of the third mobile apparatus and the car apparatus will be transmitted to each other; the third mobile apparatus will obtain the basic information of the car apparatus, and the car apparatus will obtain the basic information of the third mobile apparatus.
  b. After obtaining the basic information of the third mobile apparatus, the car apparatus will transmit the basic information of the third mobile apparatus and the car apparatus to the network server. The network server will synchronize the data of the third mobile apparatus with that of the car apparatus, and convert the use right of the car dedicated application.

The abovementioned step of registering the car apparatus further includes the step of changing the agency (can be an auto dealer). The step of changing the agency (can be an auto dealer) comprises that:

(1) A second agency (can be an auto dealer) applies for a second agency (can be an auto dealer) account from a network server. After confirmation and approval by the network server, a second agency (can be an auto dealer) webpage can be opened on the website of the network server using the second agency (can be an auto dealer) account to input the basic information of the second agency (can be an auto dealer), at least the data of one second service personnel and the registration data of plural car apparatuses.

(2) An agency (can be an auto dealer) dedicated application is installed on a second mobile apparatus. The basic information of the second service personnel are inputted and uploaded to the second agency (can be an auto dealer) webpage. After confirmation and approval by the second agency (can be an auto dealer) webpage, the second agency (can be an auto dealer) webpage will transmit a second activation message to the second mobile apparatus, and then the second mobile apparatus can use the agency (can be an auto dealer) dedicated application which includes a QR code reader.

(3) The second service personnel uses the QR code reader in the agency (can be an auto dealer) dedicated application of the second mobile apparatus to read the QR code of the car apparatus, and then a plate number field will appear. After inputting the plate number by the second service personnel, the registration data of the car apparatus will be transmitted to the network server.

(4) The network server will compare the registration data. The network server queries whether a new agency (can be an auto dealer) is logged in, and the screen of the car apparatus will display the pages of the first agency (can be an auto dealer) and the second agency (can be an auto dealer). The car owner can remove the second agency (can be an auto dealer) and the car apparatus will notify the first agency (can be an auto dealer) to display on the first agency (can be an auto dealer) webpage that the car owner is to remove the first agency (can be an auto dealer) and change to the second agency (can be an auto dealer). If the first agency (can be an auto dealer) clicks to agree or does not respond in one month, then the first agency (can be an auto dealer) will be replaced by the second agency (can be an auto dealer).

The abovementioned first agency (can be an auto dealer) and second agency (can be an auto dealer) can transmit the advertisement or the message of notification to the car apparatus and the third mobile apparatus.

The abovementioned network server will push note a message to the first agency (can be an auto dealer) or the second agency (can be an auto dealer), the car apparatus, and the first, second and third mobile apparatuses, when the car apparatus reaches a specified time period.

The abovementioned step of connecting the car apparatus to the third mobile apparatus further includes a step of withdrawing the third mobile apparatus from connection. When the third mobile apparatus is disconnected and the user dedicated application is activated, the settings and dialog records when the third mobile apparatus is connected to the car apparatus will be downloaded to the third mobile apparatus.

The abovementioned step of connecting the car apparatus to the third mobile apparatus further includes a step of updating the version of the car apparatus, wherein the user dedicated application will remember the basic information that pairs with the car apparatus, and when the third mobile apparatus activates the user dedicated application, the third mobile apparatus will return the basic information of the car apparatus and the network server will check whether the basic information of the car apparatus needs to be updated; if the update is required, then the network server will push note a download message.

The abovementioned third mobile apparatus can pair with plural car apparatuses and the car apparatus can pair with plural third mobile apparatuses.

The abovementioned step of registering the car apparatus further includes a step of comparing the plate number, comprising that:

(1) The network server will compare the plate number of the registration data. If the plate number is new, then the agency (can be an auto dealer) dedicated application will query whether a new subscriber is logged in. If the answer is "yes," then a new account will be opened, and the account will record the registration data. On the other hand, if the answer is "no," then a message of "please confirm the plate number" is responded and then the application ends.

(2) If the plate number has been logged in already, then the UUID of the registration data is compared. If the comparison is true, then the time stamp of data will be compared and the difference will be synchronized. On the other hand, if the UUID is different, then the application queries "do you want to change to a new car apparatus?" If the answer is "yes," then it means that a new car apparatus is to be used and all the data will be synchronized. However, no data updating will be done while setting up the car apparatus. On the other hand, if the answer is "no," then a message of "please confirm the plate number and the serial number of the car apparatus" will be responded.

Accordingly, by the method of the present invention, the functions of the mobile apparatus can be used freely, the car apparatus can be managed by the agency (can be an auto dealer), and by pairing the mobile apparatus with the car apparatus, a connection channel is set up among the agency (can be an auto dealer), the car apparatus, and the mobile apparatus that pairs with the car apparatus, which can only be achieved by combining the car apparatus with the mobile apparatus.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
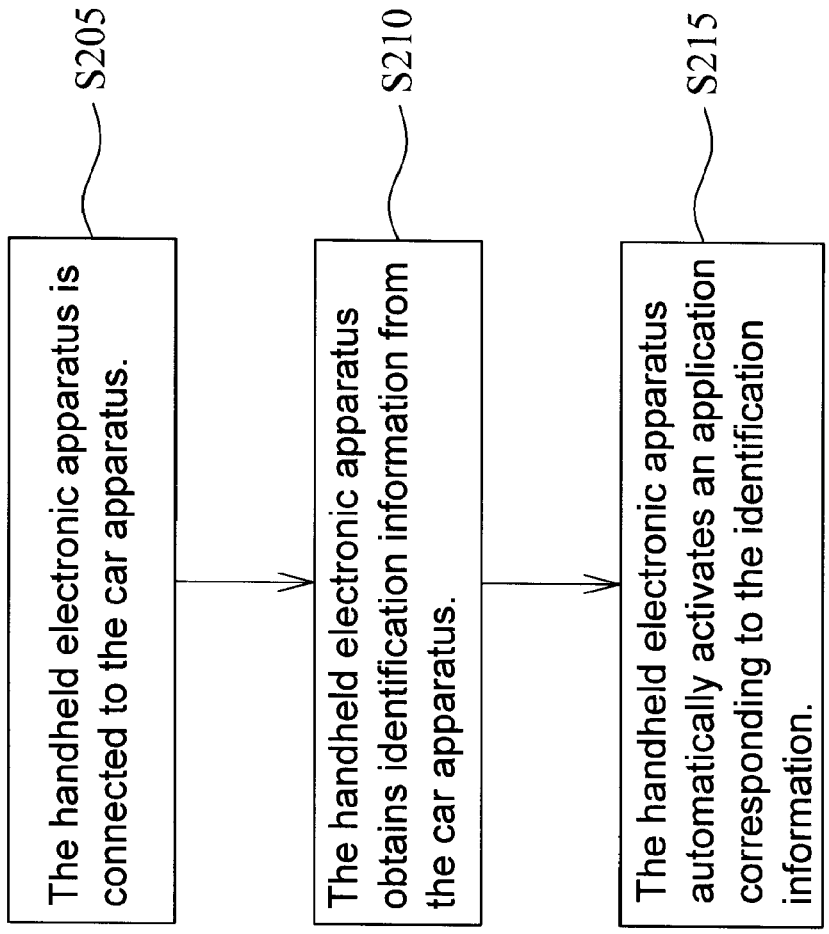
FIG. 1 shows a flow diagram of a method disclosed by the prior art.
Figure 2:
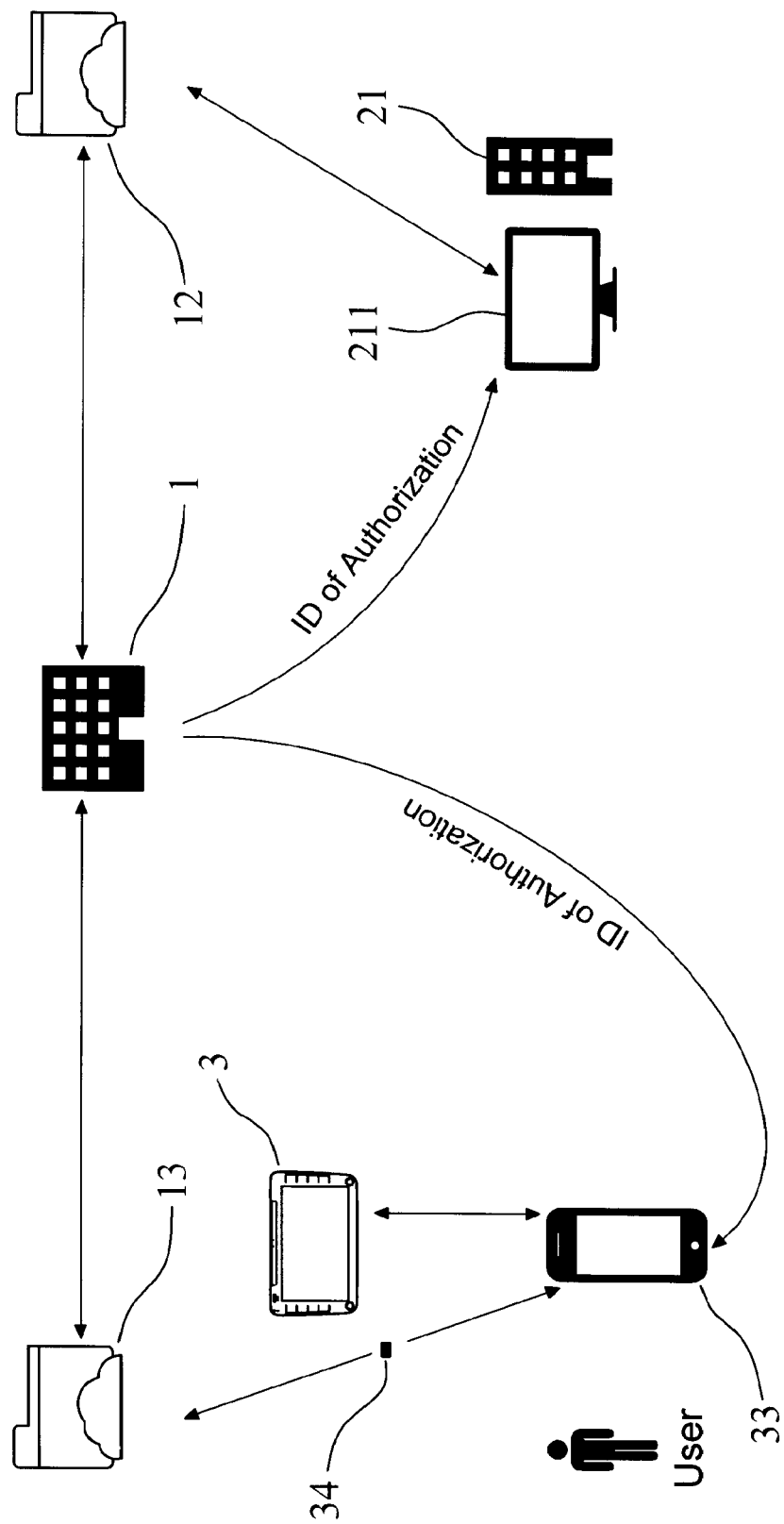
FIG. 2 shows a schematic view of an embodiment of a first agency (can be an auto dealer), according to a first embodiment of the present invention.

Referring to FIGS. 2 to 5, a first embodiment of the registration and connection method for the car apparatus and the mobile apparatus comprises following steps:

(1) Registration of a car apparatus 3 (step 61)

a. A first agency (can be an auto dealer) 21 applies for a first agency (can be an auto dealer) account from a network server 1, and after confirmation and approval by the network server 1, a first agency (can be an auto dealer) webpage 211 can be opened on a website of the network server 1 using the first agency (can be an auto dealer) account to input the basic information and the registration data of plural car apparatuses 3 of the first agency (can be an auto dealer) 21 (step 611) (In step 611, the first agency (can be an auto dealer) 21 uses an e-mail to apply for a first agency (can be an auto dealer) account and password of the first agency (can be an auto dealer) 21 from the network server 1. After confirmation and approval by the network server 1, the first agency (can be an auto dealer) webpage 211 can be opened on the website of the network server 1 using the first agency (can be an auto dealer) account, and the first agency (can be an auto dealer) 21 will then input the basic information of the first agency (can be an auto dealer) 21 [such as the contact number of the first agency (can be an auto dealer) 21, the contact number and address of a repair station] and the registration data of plural car apparatuses 3. The first agency (can be an auto dealer) webpage 211 can manage the messages of the first agency (can be an auto dealer) 21 with the car owner [such as the words left by the car owner, the messages of malfunction or warranty limit of the car, the responses to the car owner, or the messages and advertisements issued to all or a part of the car owners], whereas the first agency (can be an auto dealer) webpage 211 is controlled by the network server 1.)

b. The first agency (can be an auto dealer) 21 inputs the registration data of the car apparatus 3 on the first agency (can be an auto dealer) webpage 211 of the network server 1. The registration data includes at least the serial number and the plate number of the car apparatus 3, and the registration data of the car apparatus 3 is transmitted to the network server 1 (step 612) (In step 612, the first agency (can be an auto dealer) 21 inputs the registration data of the car apparatus 3 on the first agency (can be an auto dealer) webpage 211 of the network server 1. The registration data includes at least the serial number and the plate number of the car apparatus 3, and that registration data can even include the UUID and version of the car apparatus 3. The registration data of the car apparatus 3 is transmitted to the network server 1, and the network server 1 will store the registration data in the first agency (can be an auto dealer) webpage 211.)

(2) Registration of a third mobile apparatus 33 (step 62)

A user dedicated application is installed on the third mobile apparatus 33, and the basic information of the third mobile apparatus 33 are inputted and uploaded to the network server 1. The network server 1 will transmit a message 34 to the third mobile apparatus 33, and after confirming that message 34, the third mobile apparatus 33 can use that user dedicated application (In step 62, a user dedicated application is installed on the third mobile apparatus 33 [step 621] which is a smart phone or tablet PC (personal computer). The basic information of the third mobile apparatus 33 [such as the telephone number and name] are inputted and uploaded to the network server 1 [step 622]. The network server 1 will transmit a message 34 to the third mobile apparatus 33, and after confirming that message 34 [step 623], the third mobile apparatus 33 can use the user dedicated application [step 624]. The third mobile apparatus 33 is connected to the network server 1, transmitting data through 3G, 4G or 5G. Any smart phone owner can download and register the user dedicated application. The user dedicated application contains programs such as a QR code reader. The user can use the smart phone alone without purchasing a car apparatus, but only the smart phone mode can be used. The smart phone can also be used with the car apparatus if the user has purchased a car apparatus. The product manual and the catalog of the car apparatus application are listed with the names of the QR code and application. Once the smart phone QR code reader takes a snap shot, the smart phone can go online to download the user dedicated application, or the user can download the user dedicated application manually from the APP store or Google play for use.)

(3) Connecting the car apparatus to the third mobile apparatus (step 63)

a. A car dedicated application is installed on the car apparatus 3. After the third mobile apparatus 33 has paired with the car apparatus 3 using BLUETOOTH wireless technology standard, the basic information of the two apparatuses will be transmitted to each other; the third mobile apparatus 33 will obtain the basic information of the car apparatus 3, and the car apparatus 3 will obtain the basic information of the third mobile apparatus 33 (step 631) (In step 631, a car dedicated application is installed on the car apparatus 3 sold by the first agency (can be an auto dealer) 33. When the third mobile apparatus 33 pairs with the car apparatus 3 using BLUETOOTH wireless technology standard, a screen of the car apparatus 3 will display "please activate the user dedicated application while pairing" to facilitate using the car dedicated application in the future. Next, the screen of the car apparatus 3 will display "confirm" or "abort the car dedicated application." If the user clicks on "confirm," then he or she will wait for the third mobile apparatus 33 to activate the user dedicated application. If the user dedicated application is not activated, then the user will be reminded of again. If the user selects abort, then a message of "the third mobile apparatus 33 cannot go online using PAN (Personal Area Network)" will be displayed. Unless removing the pairing, pairing again will enable the car apparatus 3 to obtain the pairing data of the third mobile apparatus 33, such as the BT (BLUETOOTH wireless technology standard) MAC (Media Access Control) address and the telephone number. Later on, these two IDs will be used to connect the account of the third mobile apparatus 33 to the account of the car apparatus 3. After the third mobile apparatus 33 has paired with the car apparatus 3 using BLUETOOTH wireless technology standard, the basic information of the two apparatuses [such as WIFI, gold keys, telephone numbers and names] will be transmitted to each other; the third mobile apparatus 33 will obtain the basic information of the car apparatus 3, and the car apparatus 3 will obtain the basic information of the third mobile apparatus 33.)

b. After obtaining the basic information of the third mobile apparatus 33, the car apparatus 3 will transmit the basic information of the third mobile apparatus 33 and the car apparatus 3 to the network server 1. The network server 1 will synchronize the data of the third mobile apparatus 33 with that of the car apparatus 3, and convert the use right of the car dedicated application (step 632) (In step 632, after obtaining the basic information of the third mobile apparatus 33, the car apparatus 3 will connect PAN to go online with the network server 1 using BLUETOOTH wireless technology standard, and the car apparatus 3 will upload data to the network server 1, reporting the paired third mobile apparatus 33 to the network server 1, and transmitting the basic information of the third mobile apparatus 33 and the car apparatus 3 [such as the UUID of the car apparatus 3 and the BLUETOOTH wireless technology standard location at which the third mobile apparatus 33 is paired and connected] to the network server 1. The network server 1 will synchronize the data of the third mobile apparatus 33 with that of the car apparatus 3, and convert the use right of the car dedicated application, such as a conversation program which downloads the dialog records of the last communication target of the third mobile apparatus 33. When the third mobile apparatus 33 is on board, the application switches to the car apparatus mode, and to the smart phone mode when off board. The user dedicated application used by the car owner is primarily based upon the account of the third mobile apparatus 33. After the third mobile apparatus 33 has been on board, the car apparatus 3 will use the account of the third mobile apparatus 33 to continue exploiting the functions of the car dedicated application.)

Figure 3:
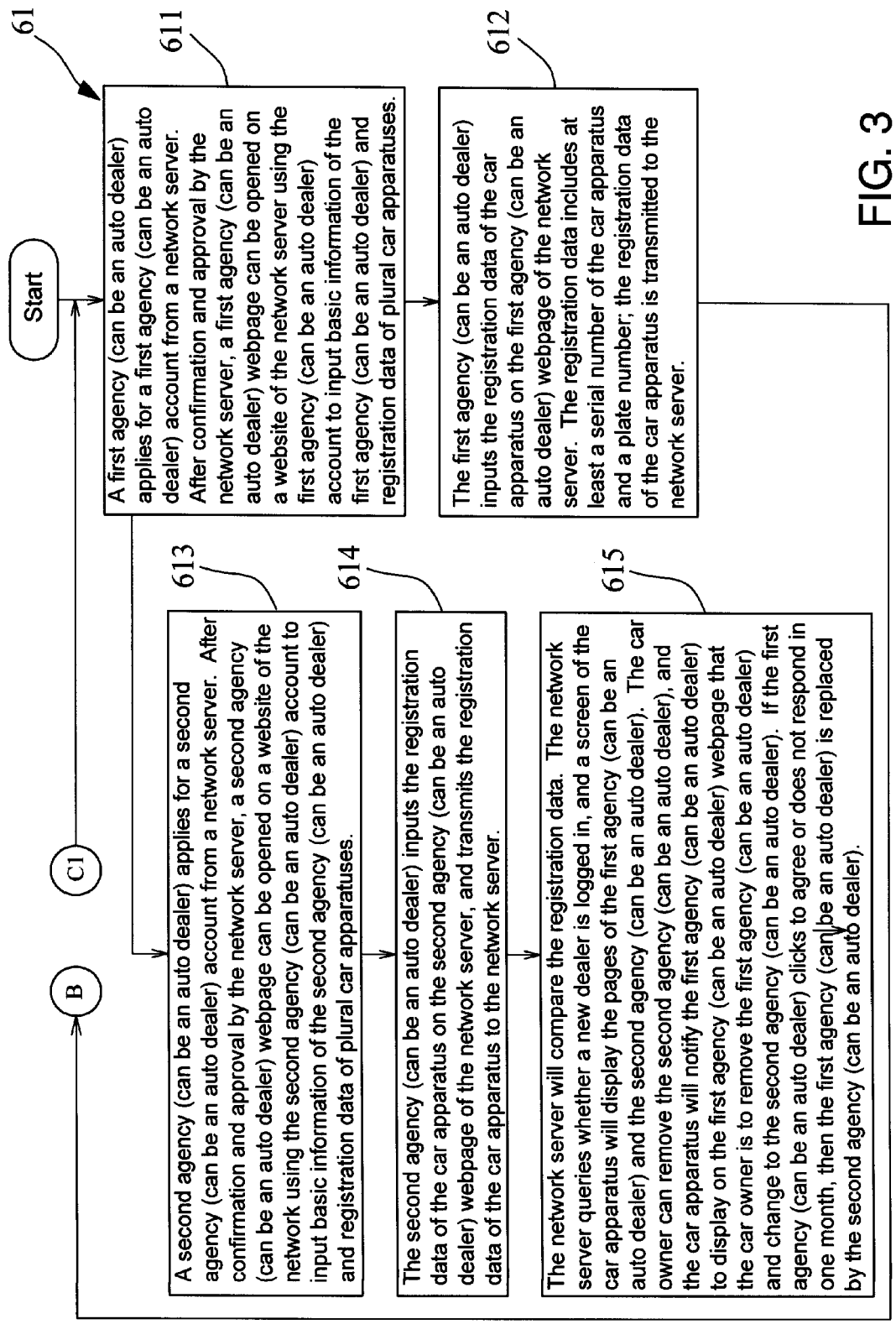
FIG. 3 shows a flow diagram of a method of the first embodiment of the present invention.
Figure 6:
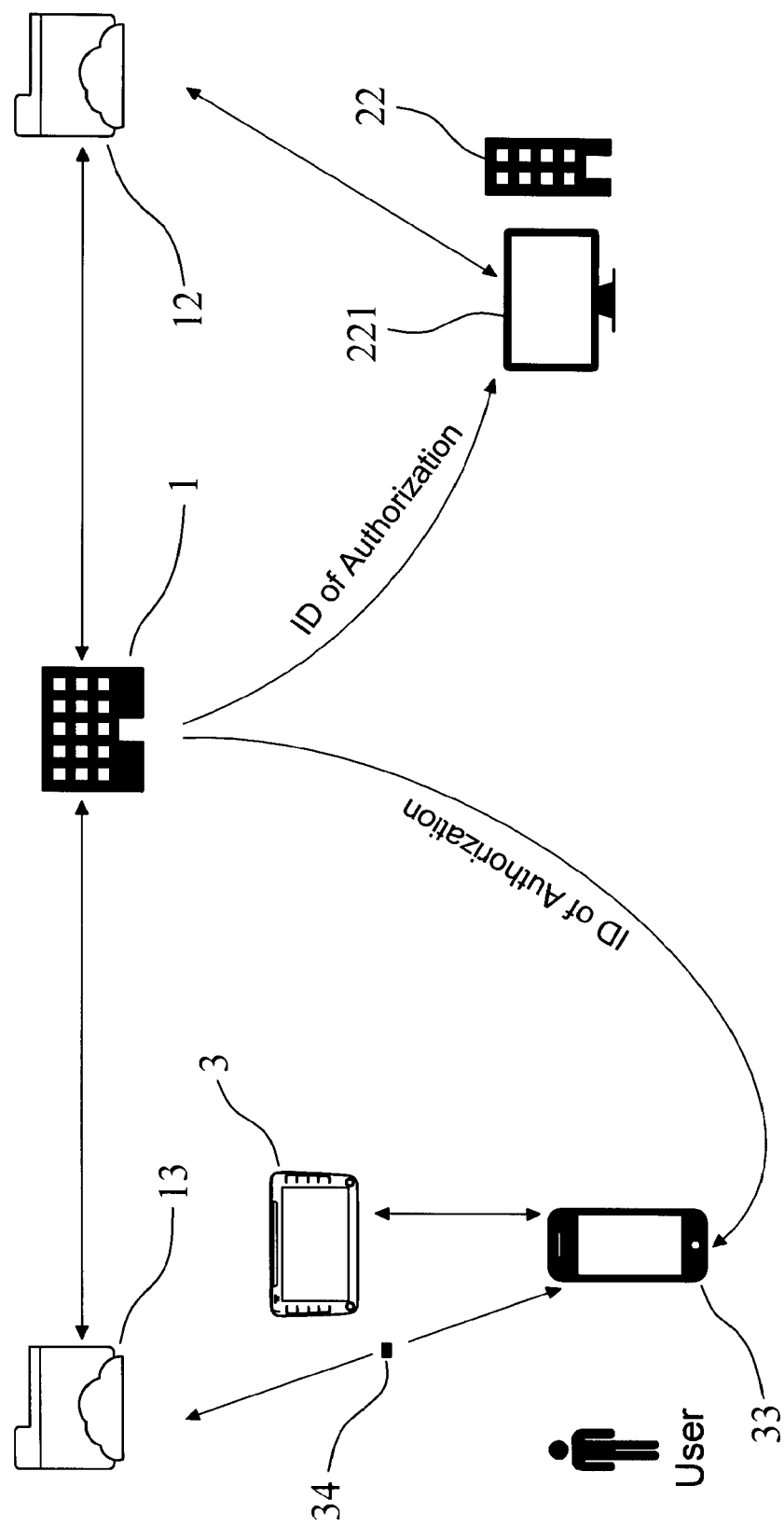
FIG. 6 shows a schematic view of an embodiment of a second agency (can be an auto dealer), according to the first embodiment of the present invention.

Referring to FIG. 6, when the car owner is to change the agency (can be an auto dealer) (or the repair station, maintenance shop), the new agency (can be an auto dealer) should apply for a new agency (can be an auto dealer) account from the network server 1 that the service personnel of the new agency (can be an auto dealer) can use the agency (can be an auto dealer) dedicated application. In the registration and connection method for the car apparatus and the mobile apparatus, according to the present invention, the step of registering the car apparatus further includes a step of changing the agency (can be an auto dealer), comprising that (as shown in FIG. 3):

(1) A second agency (can be an auto dealer) 22 applies for a second agency (can be an auto dealer) account from the network server 1. After confirmation and approval by the network server 1, a second agency (can be an auto dealer) webpage 221 can be opened on the website of the network server 1 using the second agency (can be an auto dealer) account to input the basic information and the registration data of plural car apparatuses 3 of the second agency (can be an auto dealer) 22 (step 613) (In step 613, the second agency (can be an auto dealer) 22 uses an e-mail to apply for the account and password of the second agency (can be an auto dealer) 22 from the network server 1. After confirmation and approval by the network server 1, a second agency (can be an auto dealer) webpage 221 can be opened on the website of the network server 1 using the second agency (can be an auto dealer) account, and the basic information of the second agency (can be an auto dealer) 22 [such as the contact number of the second agency (can be an auto dealer) 22, the contact number and address of the repair station] and the registration data of plural car apparatuses 3 are inputted by the second agency (can be an auto dealer) 22. The second agency (can be an auto dealer) webpage 221 can manage the messages of the second agency (can be an auto dealer) 22 with the car owner [such as the words left by the car owner, the messages of malfunction or warranty limit of the car and the responses to the car owner, or the messages and advertisements issued to all or a part of the car owners], and the second agency (can be an auto dealer) webpage 221 is controlled by the network server 1.)

(2) The second agency (can be an auto dealer) 22 inputs the registration data of the car apparatus 3 on the second agency (can be an auto dealer) webpage 221 of the network server 1, and transmits the registration data of the car apparatus 3 to the network server 1 (step 614) (In step 614, the second agency (can be an auto dealer) 22 inputs the registration data of the car apparatus 3 on the second agency (can be an auto dealer) webpage 221 of the network server 1, and transmits the registration data of the car apparatus 3 to the network server 1; whereas, the network server 1 will store the registration data in the second agency (can be an auto dealer) webpage 221.)

(3) The network server 1 will compare the registration data. The network server 1 queries whether a new agency (can be an auto dealer) is logged in, and a screen of the car apparatus 3 will display the pages of the first agency (can be an auto dealer) 21 and the second agency (can be an auto dealer) 22. The car owner can remove the page of the second agency (can be an auto dealer) 22 automatically, and the car apparatus 3 will notify the first agency (can be an auto dealer) 21 to display on the first agency (can be an auto dealer) webpage 211 that the car owner is to remove the first agency (can be an auto dealer) 21 and change to the second agency (can be an auto dealer) 22. If the first agency (can be an auto dealer) 21 clicks to agree or does not respond in one month, then the first agency (can be an auto dealer) 21 will be replaced by the second agency (can be an auto dealer) 22 (step 615) (In step 615, the network server 1 will compare the registration data. If the registration data is transmitted by other agency (can be an auto dealer), then the network server 1 will query whether a new agency (can be an auto dealer) is logged in. If the answer is "yes," then the second agency (can be an auto dealer) 22 will be logged in temporarily, and the network server 1 will query whether to agree to change to a new agency (can be an auto dealer) when the car apparatus 3 is connected to the network server 1 next time. The screen of the car apparatus 3 will display the pages of the first agency (can be an auto dealer) 21 and the second agency (can be an auto dealer) 22, and query whether to log in as the new agency (can be an auto dealer) for the car. If the answer is "no," then the car owner can remove the second agency (can be an auto dealer) 22. If the answer is "yes," then the data of the second agency (can be an auto dealer) 22 will be downloaded to the second agency (can be an auto dealer) page 221 of the car apparatus 3, and the car apparatus 3 will notify the first agency (can be an auto dealer) 21 to display on the first agency (can be an auto dealer) webpage 211 that the car owner is to remove the first agency (can be an auto dealer) 21 and change to the second agency (can be an auto dealer) 22. If the first agency (can be an auto dealer) 21 clicks to agree or does not respond in one month, then the first agency (can be an auto dealer) 21 will be replaced by the second agency (can be an auto dealer) 22.)

The abovementioned network server 1 will push note a message to the first agency (can be an auto dealer) 21, the car apparatus 3, and the third mobile apparatus 33, when the car apparatus 3 reaches a specified time period which can be the warranty limit of the car apparatus 3, the free update time of the navigation maps or the free update time of the new navigation software, or the periodical maintenance of the car (such as for every 10,000 miles or 6 months). Each time when the car power is turned on (ACC on), the car apparatus 3 will connect PAN using BLUETOOTH wireless technology standard, and return the mileage between services to the network server 1.

The abovementioned third mobile apparatus 33 can pair with plural (such as four) car apparatuses 3, and the car apparatus 3 can pair with plural (such as four) third mobile apparatuses 33.

The abovementioned first agency (can be an auto dealer) webpage 211 and second agency (can be an auto dealer) webpage 221 can be stored in an agency (can be an auto dealer) database 12 which is controlled by the network server 1. The basic information of the third mobile apparatus 33 can be stored in a user database 13 which is also controlled by the network server 1.

The abovementioned step of connecting the car apparatus 3 to the third mobile apparatus 33 further includes a step of withdrawing the third mobile apparatus 33 from connection; that is, when the third mobile apparatus 33 is disconnected and the user dedicated application is activated, the settings and dialog records when the third mobile apparatus 33 is connected to the car apparatus 3 are downloaded to the third mobile apparatus 33.

The abovementioned step of connecting the car apparatus 3 to the third mobile apparatus 33 further includes a step of updating the version of the car apparatus 3; that is, the user dedicated application will remember the basic information that pairs with the car apparatus 3 (such as the UUID or the version numbers of all software and firmware), and when the third mobile apparatus 33 activates the user dedicated application, the third mobile apparatus 33 will return the version of the car apparatus 3 (i.e., the versions of all software and firmware of the car apparatus 3), and the network server 1 will check whether the version of the car apparatus 3 (i.e., the versions of all software and firmware of the car apparatus 3) needs to be updated. If the version update is needed, then the network server 1 will push note a download message.

Figure 7:
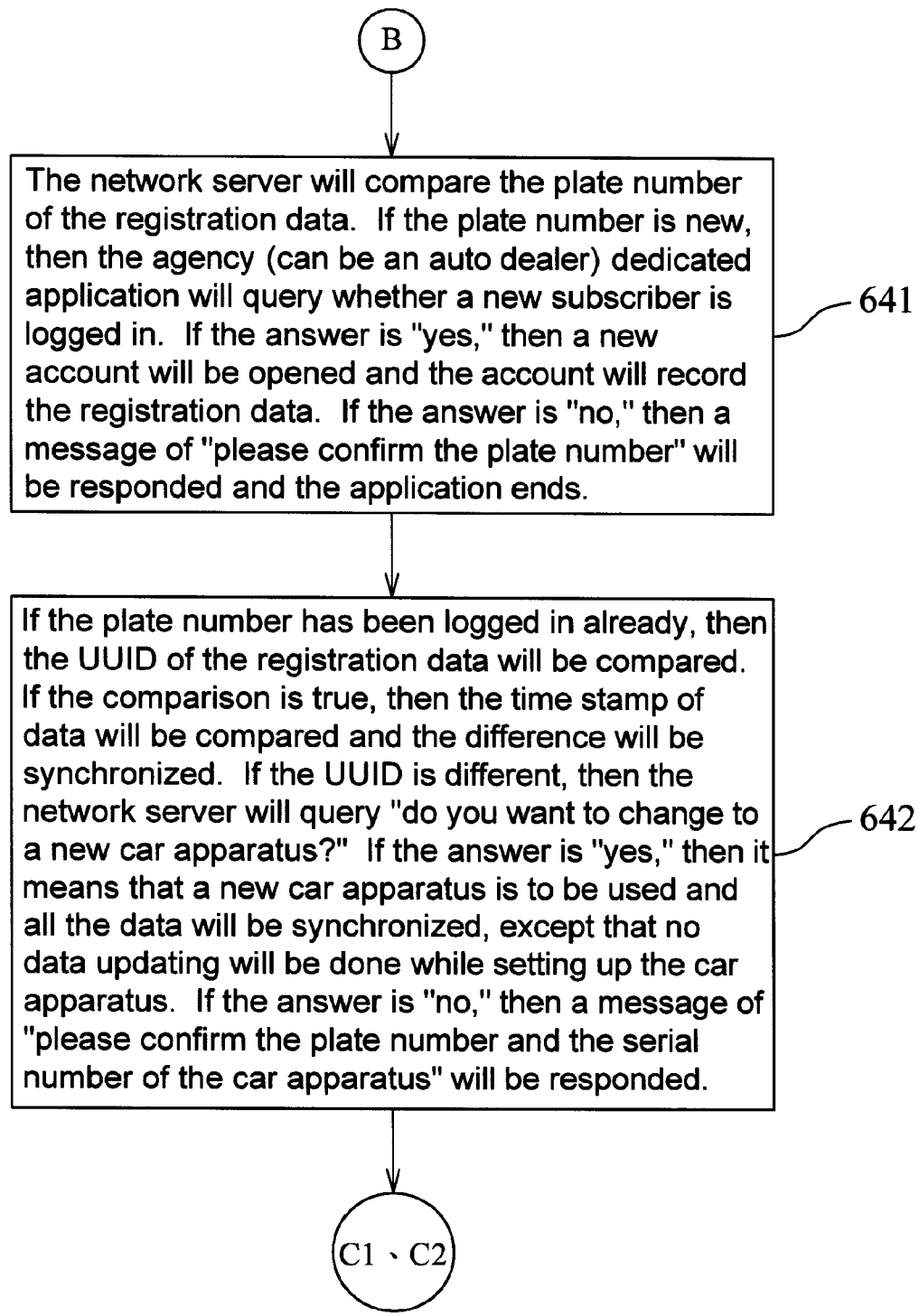
FIG. 7 shows a flow diagram of a step of comparing a plate number, according to the present invention.

The abovementioned step of registering the car apparatus (step 61) further includes a step of comparing the plate number. The plate number comparison step includes that (as shown in FIG. 3 and FIG. 7):

a. The network server 1 will compare the plate number of the registration data. If the plate number is new, then the agency (can be an auto dealer) dedicated application will query whether a new subscriber is logged in. If the answer is "yes," then a new account will be opened, and that account will record the registration data. If the answer is "no," then a message of "please confirm the plate number" is responded and the application ends (step 641) (In step 641, the network server 1 will compare the plate number of the registration data. If the plate number is new, then the agency (can be an auto dealer) dedicated application will query whether a new subscriber is logged in. If the answer is "yes," then a new account will be opened, and that account will record the registration data [including the serial number and all related data of the car apparatus, the warranty limit of the car apparatus, the expiration date of the navigation software, the UUID, the BLUETOOTH wireless technology standard location of each paired smart phone, the mileage to the next service [computed by the navigation software]. If the answer is "no," then a message of "please confirm the plate number" is responded and the application ends.)

b. If the plate number has been logged in already, then the UUID of the registration data will be compared. If the comparison is true, then the time stamp of data will be compared and the difference will be synchronized. If the UUID is different, then the application will query "do you want to change to a new car apparatus?" If the answer is "yes," then it means that a new car apparatus 3 is to be used, and all the data will be synchronized. However, no data updating will be done while setting up the car apparatus. If the answer is "no," on the other hand, a message of "please confirm the plate number and the serial number of the car apparatus" is responded (step 642) (In step 642, if the plate number has been logged in already, then the UUID of the registration data will be compared. If the comparison is true, then the time stamp of data will be compared and the difference will be synchronized. If the UUID is different, then the application will query "do you want to change to a new car apparatus?" If the answer is "yes," then it means that a new car apparatus 3 is to be used [breakdown maintenance], and all the data will be synchronized. However, no data updating will be done while setting up the car apparatus [such as the warranty limit, the free update time of the navigation maps or the free update time of the new navigation software, or the periodical maintenance of the car for such as every 10,000 miles or 6 months. If the answer is "no," then a message of "please confirm the plate number and the serial number of the car apparatus" is responded.)

The abovementioned step of comparing the plate number can assure that even the car apparatus 3 is changed, the effect will still be the same while setting up the car apparatus 3 or in the warranty limit.

Figure 8:
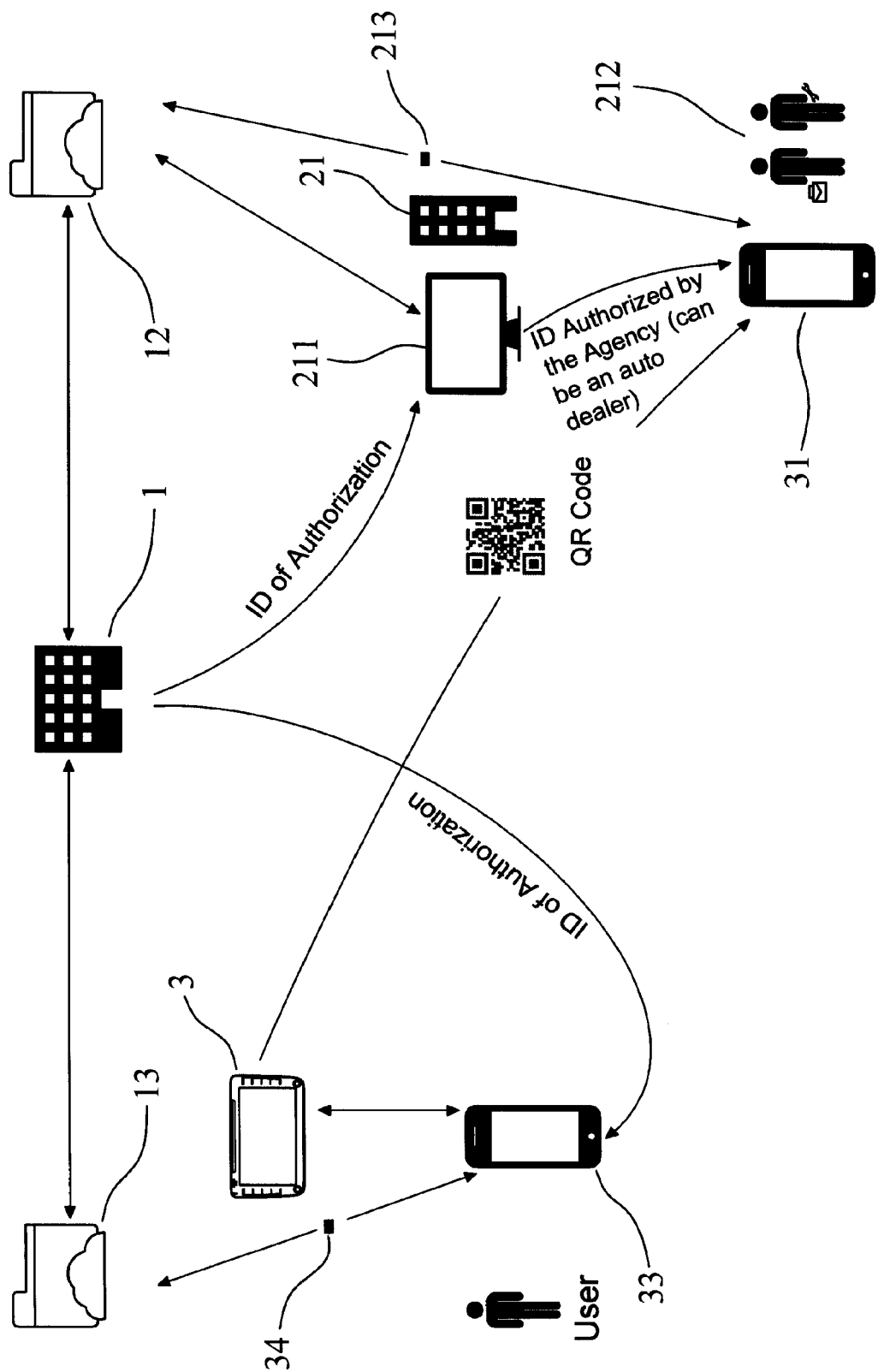
FIG. 8 shows a schematic view of an embodiment of the first agency (can be an auto dealer), according to the second embodiment of the present invention.
Figure 9:
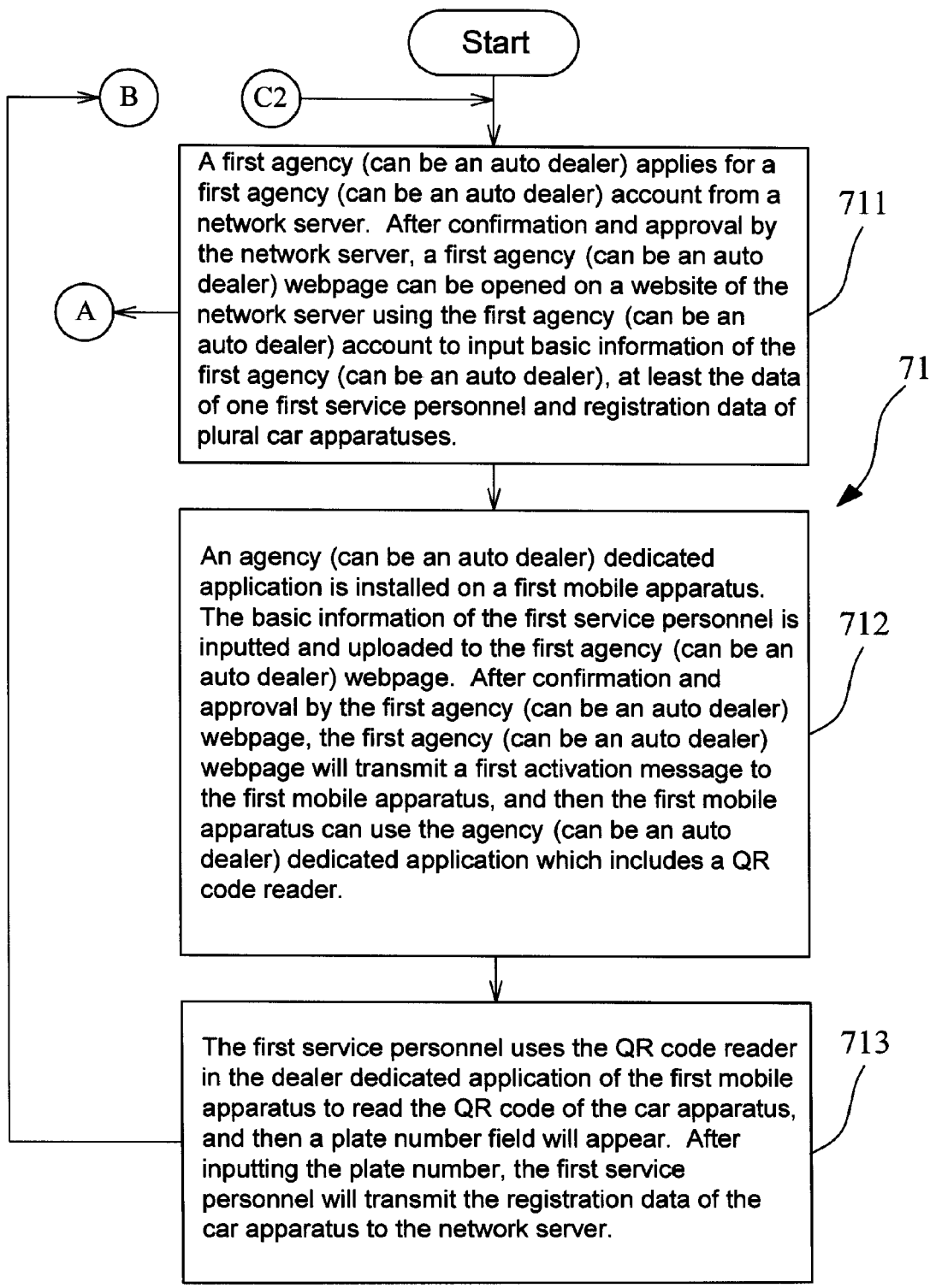
FIG. 9 shows a flow diagram of the method of the second embodiment of the present invention.

Referring to FIG. 8, a second embodiment of the registration and connection method for the car apparatus and the mobile apparatus, according to the present invention, comprises following steps:

(1) Registration of a car apparatus 3 (step 71, as shown in FIG. 9)

a. A first agency (can be an auto dealer) 21 applies for a first agency (can be an auto dealer) account from a network server 1. After confirmation and approval by the network server 1, a first agency (can be an auto dealer) webpage 211 can be opened on the website of the network server 1 using the first agency (can be an auto dealer) account to input the basic information, at least the data of one first service personnel 212 and the registration data of plural car apparatuses 3 of the first agency (can be an auto dealer) 21 (step 711) (In step 711, the first agency (can be an auto dealer) 21 uses an e-mail to apply for an account and password of the first agency (can be an auto dealer) 21 from the network server 1. After confirmation and approval by the network server 1, the first agency (can be an auto dealer) webpage 211 can be opened on the website of the network server 1 using the first agency (can be an auto dealer) account, and the first agency (can be an auto dealer) 21 will then input the basic information of the first agency (can be an auto dealer) 21 [such as the contact number of the first agency (can be an auto dealer) 21, the contact number and address of the repair station], at least the data of one first service personnel 212 (a business representative or supervisor) and the registration data of plural car apparatuses 3. The first agency (can be an auto dealer) webpage 211 can manage the first service personnel 212 [such as the changing or contact records of the business representative or supervisor, checking the words left by the car owner, the messages of malfunction or warranty limit of the car, the responses to the car owner, or the messages and advertisements issued to all or a part of the car owners], whereas the first agency (can be an auto dealer) webpage 211 is controlled by the network server 1.)

b. An agency (can be an auto dealer) dedicated application is installed on a first mobile apparatus 31. The basic information of the first service personnel 212 are inputted and uploaded to the first agency (can be an auto dealer) webpage 211. After confirmation and approval by the first agency (can be an auto dealer) webpage 211, the first agency (can be an auto dealer) webpage 211 transmits a first activation message 213 to a first mobile apparatus 31 of the first service personnel 212, and then the first mobile apparatus 31 of the first service personnel 212 can use that agency (can be an auto dealer) dedicated application which includes a QR code reader (step 712) (In step 712, an agency (can be an auto dealer) dedicated application is installed on the first mobile apparatus 31 (a smart phone or tablet PC), and the basic information of the first service personnel 212 [title, name, telephone number and first agency (can be an auto dealer) account] are inputted and uploaded to the first agency (can be an auto dealer) webpage 211. After confirmation and approval by the first agency (can be an auto dealer) webpage 211, the first agency (can be an auto dealer) webpage 211 transmits a first activation message 213 to the first mobile apparatus 31 of the first service personnel 212, and then the first mobile apparatus 31 of the first service personnel 212 can use that agency (can be an auto dealer) dedicated application. The first agency (can be an auto dealer) 21 can terminate the use right of the agency (can be an auto dealer) dedicated application of the first service personnel 212, when, for example, the first service personnel 212 quits or the business representative of the car owner is changed. The agency (can be an auto dealer) dedicated application includes a QR code reader. The first mobile apparatus 31 is connected to the network server 1, transmitting data through 3G, 4G or 5G.)

c. After the first service personnel 212 has used the QR code reader in the agency (can be an auto dealer) dedicated application to read the QR code on the BLUETOOTH wireless technology standard page of the car apparatus 3, a plate number field 311 will appear. After inputting the plate number, the first service personnel 212 will transmit the registration data of the car apparatus 3 to the network server 1 (step 713) (In step 713, after the first service personnel 212 has used the QR code reader in the agency (can be an auto dealer) dedicated application to read the QR code on the BLUETOOTH wireless technology standard page of the car apparatus 3 [the QR code contains the serial number, UUID and version of the car apparatus 3], a plate number field 311 will appear. The first service personnel 212 inputs a plate number, confirms and then transmits the registration data of the car apparatus 3 to the network server 1; whereas, the registration data includes at least the plate number, the UUID, serial number and version of the car apparatus 3. The network server 1 will store the registration data in the first agency (can be an auto dealer) webpage 211.)

Figure 4:
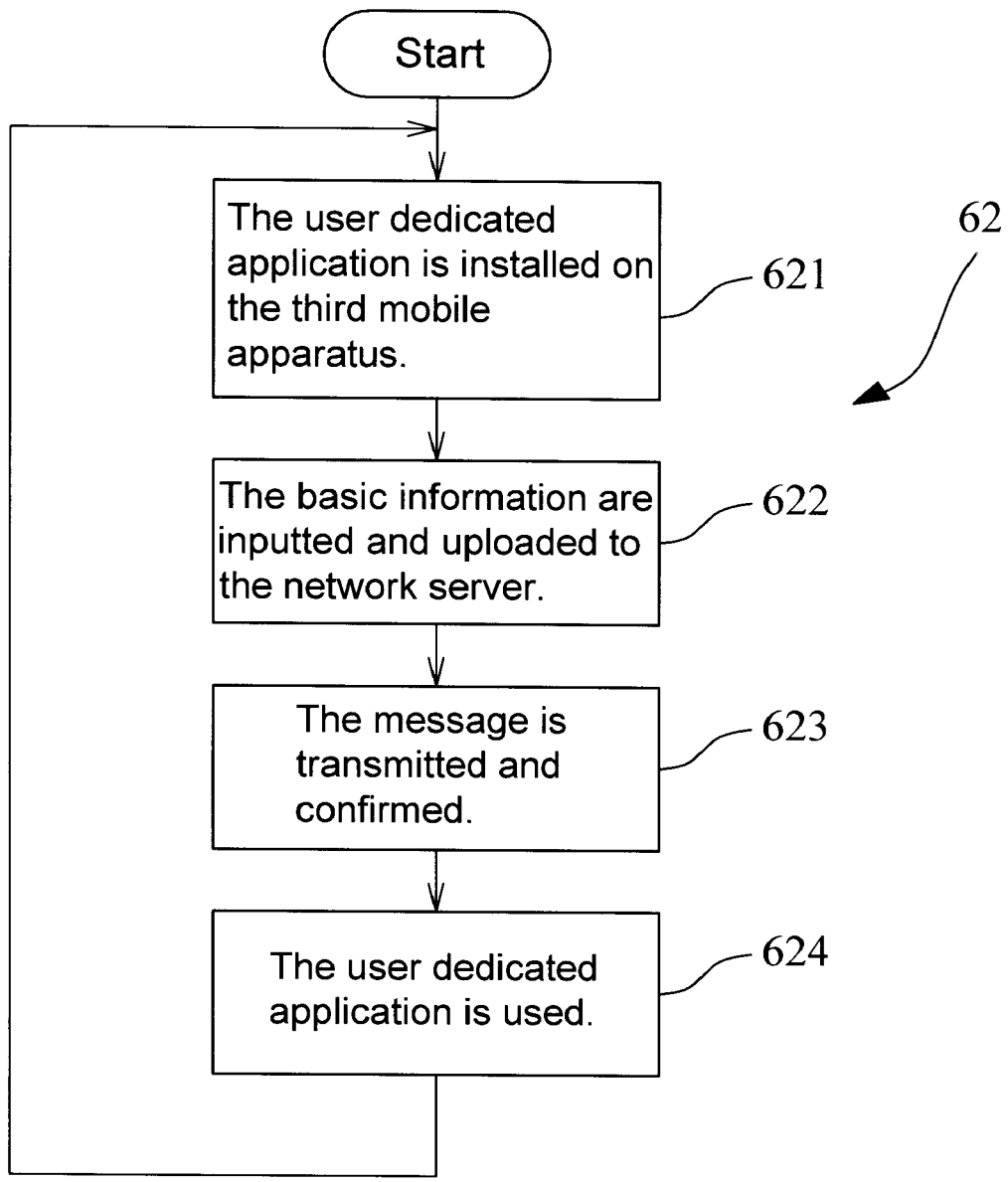
FIG. 4 shows another flow diagram of the method of the first and second embodiments of the present invention.

(2) Registration of a third mobile apparatus 33 (step 62, as shown in FIG. 4)

A user dedicated application is installed on a third mobile apparatus 33. The basic information of the third mobile apparatus 33 are inputted and uploaded to the network server 1, and the network server 1 will transmit a message 34 to the third mobile apparatus 33. After confirming that message 34, the third mobile apparatus 33 can use that user dedicated application (In step 62, a user dedicated application is installed on the third mobile apparatus 33 [step 621] which is a smart phone or tablet PC. The basic information of the third mobile apparatus 33 [such as telephone number and name] are inputted and uploaded to the network server 1 [step 622]. The network server 1 will transmit a message 34 to the third mobile apparatus 33, and after confirming that message 34 [step 623], the third mobile apparatus 33 can use that user dedicated application [step 624]. The third mobile apparatus 33 is connected to the network server 1, transmitting data through 3G, 4G or 5G. Any smart phone owner can download and register the user dedicated application which contains the QR code reader. The user can use the smart phone alone without purchasing the car apparatus, but only the smart phone mode can be used. In addition, the user dedicated application can work with the car apparatus if the user has purchased the car apparatus. The product manual and the catalog of the car apparatus application are listed with the names of the QR code and application. Once the QR code reader of the smart phone takes a snap shot, the user can go online to download the user dedicated application to the smart phone, or the user can download manually the user dedicated application in the APP store or Google play for use.)

Figure 5:
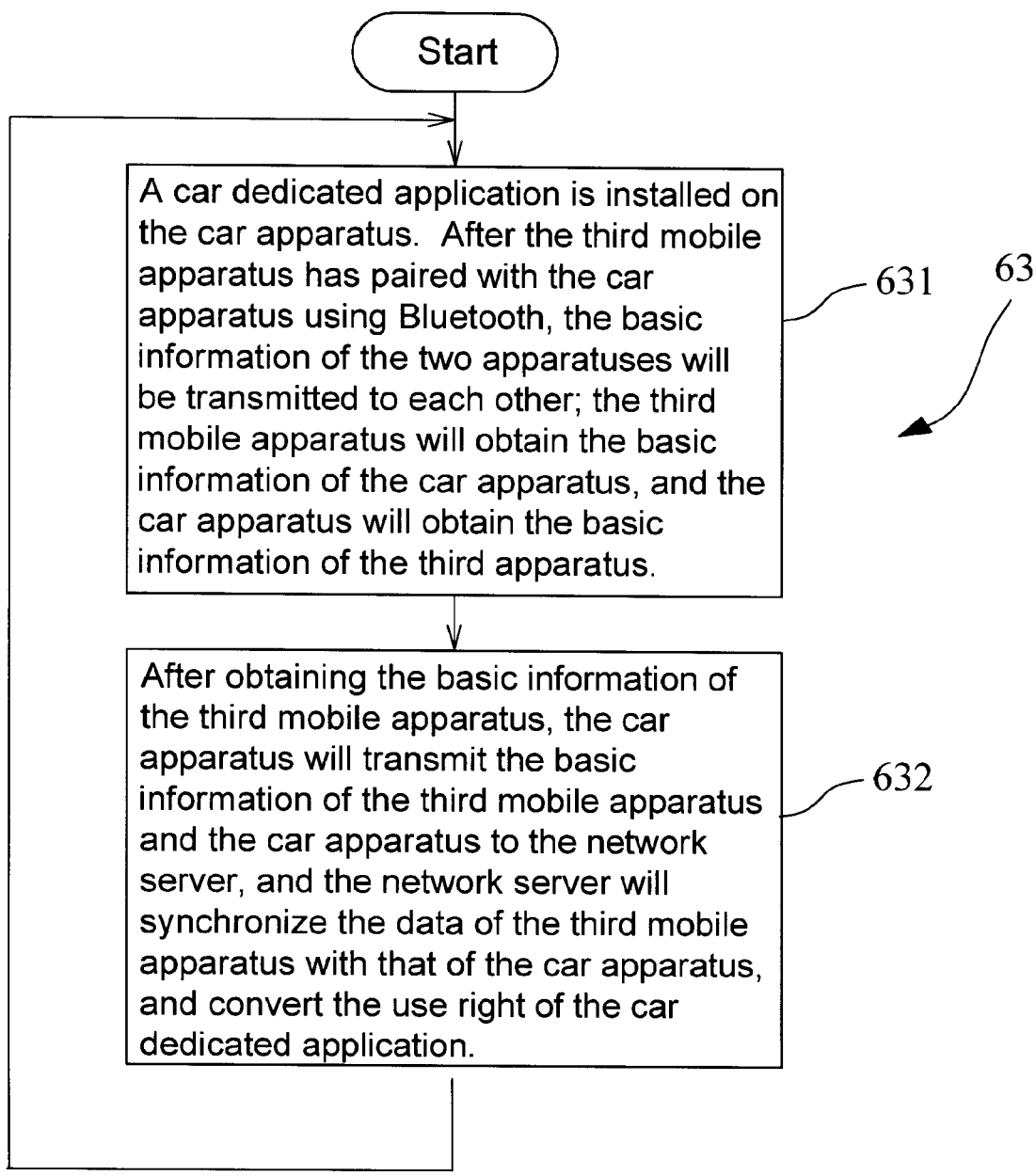
FIG. 5 shows still another flow diagram of the method of the first and second embodiments of the present invention.

(3) Connecting the car apparatus to the third mobile apparatus (step 63, as shown in FIG. 5)

a. A car dedicated application is installed on the car apparatus 3. After the third mobile apparatus 33 has paired with the car apparatus 3 using BLUETOOTH wireless technology standard, the basic information of the two apparatuses will be transmitted to each other; the third mobile apparatus 33 will obtain the basic information of the car apparatus 3, and the car apparatus 3 will obtain the basic information of the third mobile apparatus 33 (step 631) (In step 631, a car dedicated application is installed on the car apparatus 3 sold by the first agency (can be an auto dealer) 21. After the third mobile apparatus 33 has paired with the car apparatus 3 using BLUETOOTH wireless technology standard, a screen of the car apparatus 3 will display "please activate the user dedicated application while pairing" to facilitate using the car dedicated application in the future. Next, the screen of the car apparatus 3 will display "confirm" or "abort the car dedicated application." If the user clicks on "confirm," he or she will then wait for the third mobile apparatus 33 to activate the user dedicated application. If the user dedicated application is not activated, then the user will be reminded of again. If the user selects abort, then a message of "the third mobile apparatus cannot use PAN to go online" will be displayed. Unless removing the pairing, pairing again will enable the car apparatus 3 to obtain the pairing data of the third mobile apparatus 33, such as the BLUETOOTH wireless technology standard location and telephone number. Later on, these two IDs will be used to connect the account of the third mobile apparatus to the account of the car apparatus. After the third mobile apparatus 33 has paired with the car apparatus 3 using BLUETOOTH wireless technology standard, the basic information of the two apparatuses [such as WIFI, gold keys, telephone number and name] will be transmitted to each other; the third mobile apparatus 33 will obtain the basic information of the car apparatus 3, and the car apparatus 3 will obtain the basic information of the third mobile apparatus 33.)

b. After obtaining the basic information of the third mobile apparatus 33, the car apparatus 3 will transmit the basic information of the third mobile apparatus 33 and the car apparatus 3 to the network server 1. The network server 1 will synchronize the data of the third mobile apparatus 33 with that of the car apparatus 3, and convert the use right of the car dedicated application (step 632) (In step 632, after obtaining the basic information of the third mobile apparatus 33, the car apparatus 3 connects to PAN to go online with the network server 1 using BLUETOOTH wireless technology standard, and the car apparatus 3 will upload data to the network server 1, reporting the paired third mobile apparatus 33 and transmitting the basic information of the third mobile apparatus 33 and the car apparatus 3 [such as the UUID of the car apparatus 3 and the BLUETOOTH wireless technology standard location at which the third mobile apparatus 33 is paired and connected] to the network server 1. The network server 1 will synchronize the data of the third mobile apparatus 33 with that of the car apparatus 3, and convert the use right of the car dedicated application, such as a conversation program which downloads the dialog records of the last communication target of the third mobile apparatus 33. When the third mobile apparatus 33 is on board, the application switches to the car apparatus mode, and to the smart phone mode while off board. The user dedicated application used by the car owner is primarily based upon the account of the third mobile apparatus 33. After the third mobile apparatus 33 has been on board, the car apparatus 3 will use the account of the third mobile apparatus 33 to continue exploiting the functions of the car dedicated application.

Figure 10:
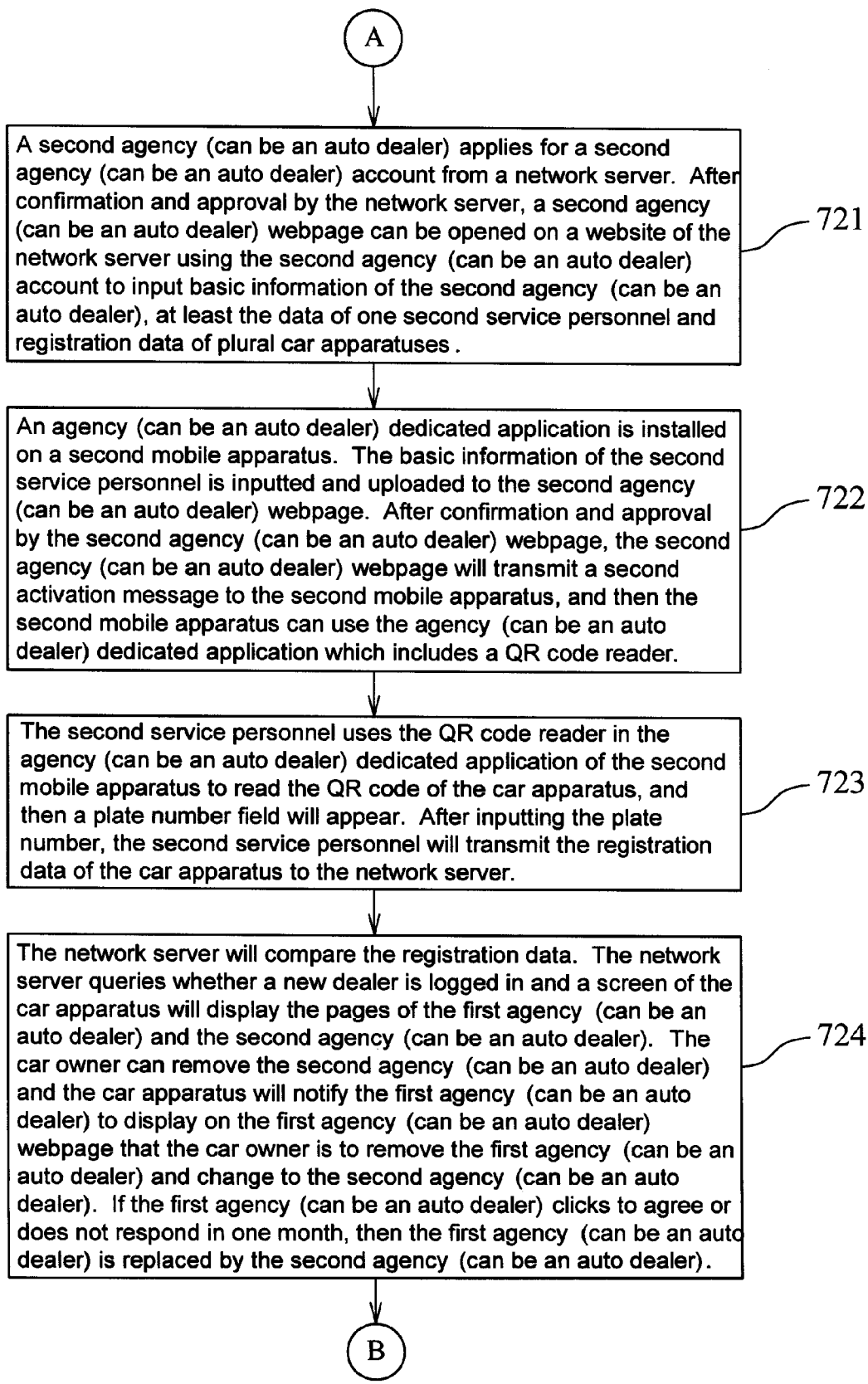
FIG. 10 shows another flow diagram of the method of the second embodiment of the present invention.
Figure 11:
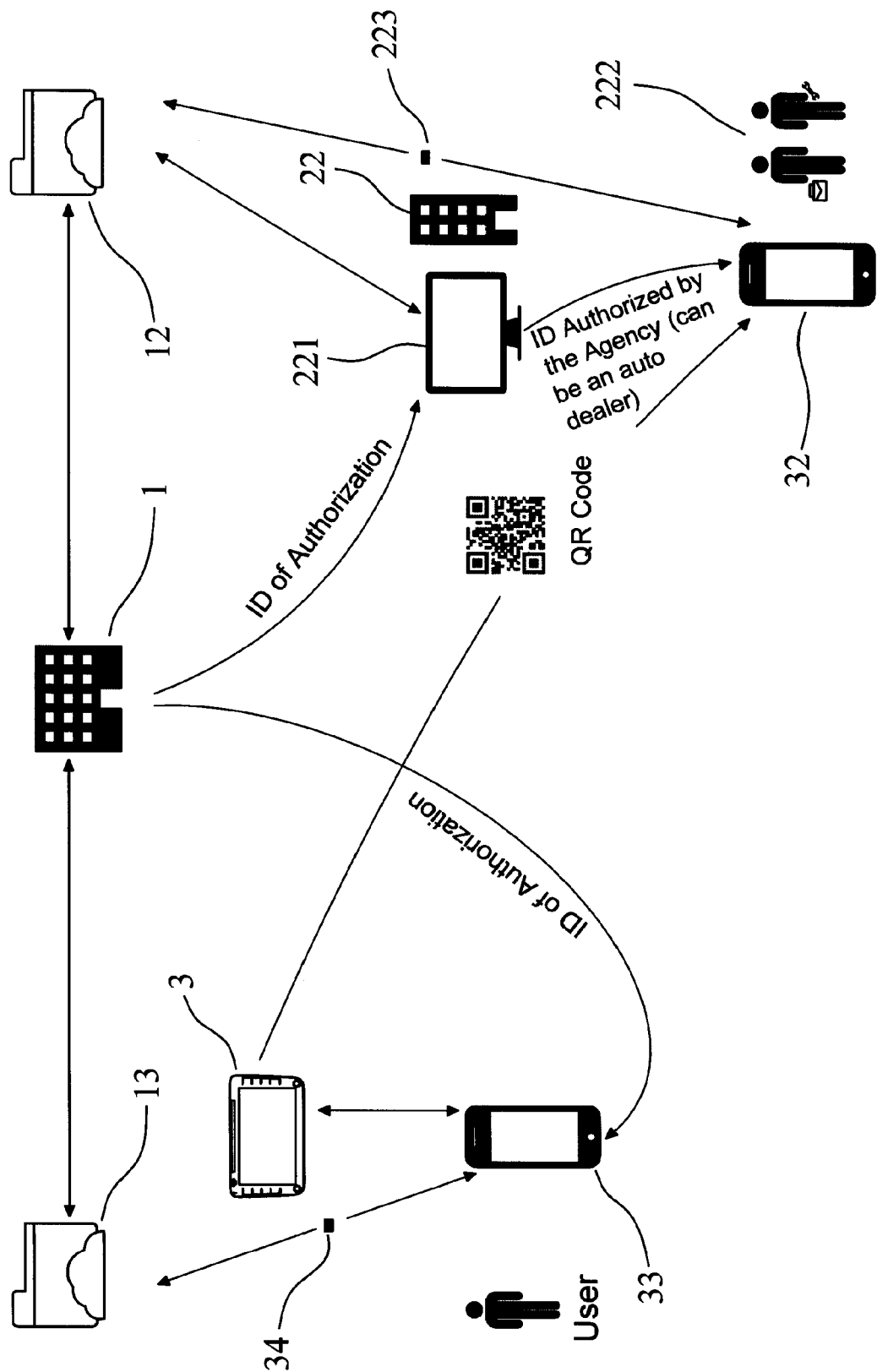
FIG. 11 shows a schematic view of an embodiment of the second agency (can be an auto dealer), according to the second embodiment of the present invention.

Referring to FIG. 11, if the car owner is to change an agency (can be an auto dealer) (or repair station, maintenance shop), the new agency (can be an auto dealer) should apply for a new agency (can be an auto dealer) account from the network server 1, and then the service personnel of the new agency (can be an auto dealer) can use the agency (can be an auto dealer) dedicated application. In the registration and connection method for the car apparatus and the mobile apparatus, according to the present invention, the step of registering the car apparatus further includes a step of changing the agency (can be an auto dealer), comprising that (as shown in FIG. 9 and FIG. 10):

(1) A second agency (can be an auto dealer) 22 applies for a second agency (can be an auto dealer) account from a network server 1. After confirmation and approval by the network server 1, a second agency (can be an auto dealer) webpage 221 can be opened on the website of the network server 1 using the second agency (can be an auto dealer) account to input the basic information of the second agency (can be an auto dealer) 22, at least the data of one second service personnel 222, and the registration data of plural car apparatuses 3 (step 721) (In step 721, the second agency (can be an auto dealer) 22 uses an e-mail to apply for a second agency (can be an auto dealer) account and password from the network server 1. After confirmation and approval by the network server 1, the second agency (can be an auto dealer) webpage 221 can be opened on the website of the network server 1 using the second agency (can be an auto dealer) account. The second agency (can be an auto dealer) 22 will then input the basic information of the second agency (can be an auto dealer) 22 [such as the contact number of the second agency (can be an auto dealer) 22, the contact number and address of a repair station], at least the data of one second service personnel 222 [a business representative or supervisor], and the registration data of plural car apparatuses 3. The second agency (can be an auto dealer) webpage 221 can manage the change of the second service personnel 222, the contact records and the messages of the car owners [such as the words left by the car owner, the messages of malfunction or warranty limit of the car and the responses to the car owner, or the messages and advertisements issued to all or a part of the car owners]. The second agency (can be an auto dealer) webpage 221 is controlled by the network server 1.)

(2) An agency (can be an auto dealer) dedicated application is installed on a second mobile apparatus 32. The basic information of the second service personnel 222 are inputted and uploaded to the second agency (can be an auto dealer) webpage 221. After confirmation and approval by the second agency (can be an auto dealer) webpage 221, the second agency (can be an auto dealer) webpage 221 will transmit a second activation message 223 to a second mobile apparatus 32 of the second service personnel 222, and then the second mobile apparatus 32 of the second service personnel 222 can use the agency (can be an auto dealer) dedicated application which includes a QR code reader (step 722) (In step 722, an agency (can be an auto dealer) dedicated application is installed on the second mobile apparatus 32 (a smart phone or tablet PC) of the second service personnel 222. The basic information of the second service personnel 222 [title, name, telephone number and second agency (can be an auto dealer) account] are inputted and uploaded to the second agency (can be an auto dealer) webpage 221. After confirmation and approval by the second agency (can be an auto dealer) webpage 221, the second agency (can be an auto dealer) webpage 221 will transmit a second activation message 223 to the second mobile apparatus 32 of the second service personnel 222, and then the second mobile apparatus 32 of the second service personnel 222 can use the agency (can be an auto dealer) dedicated application. The second agency (can be an auto dealer) 22 can terminate the use right of the agency (can be an auto dealer) dedicated application of the second service personnel 222, when, for example, the second service personnel 222 quits or the business representative of the car owner is changed. The agency (can be an auto dealer) dedicated application includes a QR code reader, and the second mobile apparatus 32 is connected to the network server 1, transmitting data through 3G, 4G or 5G.

(3) After the second service personnel 222 has used the QR code reader of the agency (can be an auto dealer) dedicated application to read the QR code on the BLUETOOTH wireless technology standard page of the car apparatus 3, a plate number field 311 will appear. After inputting the plate number, the second service personnel 222 will transmit the registration data of the car apparatus 3 to the network server 1 (step 723) (In step 723, after the second service personnel 222 has used the QR code reader of the agency (can be an auto dealer) dedicated application to read the QR code on the BLUETOOTH wireless technology standard page of the car apparatus 3 [the QR code includes the serial number, UUID and version of the car apparatus 3], a plate number field 311 will appear. The second service personnel 222 inputs the plate number, confirms and then transmits the registration data of the car apparatus 3 to the network server 1. The registration data includes at least the plate number, UUID, serial number and version of the car apparatus 3. The network server 1 will store the registration data in the second agency (can be an auto dealer) webpage 221.)

(4) The network server 1 will compare the registration data. The network server 1 queries whether a new agency (can be an auto dealer) is logged in, and a screen of the car apparatus 3 will display the pages of the first agency (can be an auto dealer) 21 and the second agency (can be an auto dealer) 22. The car owner can automatically remove the page of the second agency (can be an auto dealer) 22, and the car apparatus 3 will notify the first agency (can be an auto dealer) 21 to display on the first agency (can be an auto dealer) webpage 211 that the car owner is to remove the first agency (can be an auto dealer) 21 and change to the second agency (can be an auto dealer) 22. If the first agency (can be an auto dealer) 21 clicks to agree or does not respond in one month, then the first agency (can be an auto dealer) 21 will be replaced by the second agency (can be an auto dealer) 22 (step 724) (In step 724, the network server 1 will compare the registration data. If the registration data is transmitted by other agency (can be an auto dealer), then the network server 1 will query whether a new agency (can be an auto dealer) is logged in. If the answer is "yes," then the second agency (can be an auto dealer) 22 will be registered temporarily, and the network server 1 will query whether to agree to change to a new agency (can be an auto dealer) when the car apparatus 3 is connected to the network server 1 next time. The screen of the car apparatus 3 will display the pages of the first agency (can be an auto dealer) 21 and the second agency (can be an auto dealer) 22, and then query whether to register as the new agency (can be an auto dealer). If the user disagrees, then the car owner can remove the second agency (can be an auto dealer) 22. If the user agrees, then the data of the second agency (can be an auto dealer) 22 will be downloaded to the page of the second agency (can be an auto dealer) 22 of the car apparatus 3. The car apparatus 3 will notify the first agency (can be an auto dealer) 21 to display on the first agency (can be an auto dealer) webpage 211 that the car owner is to remove the first agency (can be an auto dealer) 21 and change to the second agency (can be an auto dealer) 22. If the first agency (can be an auto dealer) 21 clicks to agree or does not respond in one month, then the first agency (can be an auto dealer) 21 will be replaced by the second agency (can be an auto dealer) 22.)

The abovementioned network server 1 will push note a message to the first agency (can be an auto dealer) 21, the car apparatus 3 and the first, second and third mobile apparatuses 31, 32, 33, when the car apparatus 3 reaches a specified time period. The specified time period can be the warranty limit of the car apparatus 3, the free update time of the navigation maps or the free update time of the new navigation software, and the periodical maintenance of the car (e.g., for every 10,000 miles or 6 months). Each time when the car power is turned on (ACC on), the car apparatus 3 will connect PAN to go online with the network server 1 using BLUETOOTH wireless technology standard, returning the mileage between services to the network server 1.

The abovementioned third mobile apparatus 33 can pair with plural (such as four) car apparatuses 3, and the car apparatus 3 can pair with plural (such as four) third mobile apparatuses 33.

The abovementioned first agency (can be an auto dealer) webpage 211 and second agency (can be an auto dealer) webpage 221 can be stored in an agency (can be an auto dealer) database 12 which is controlled by the network server 1. The basic information of the third mobile apparatus 33 can be stored in a user database 13 which is also controlled by the network server 1.

The abovementioned step of connecting the car apparatus 3 to the third mobile apparatus 33 further includes a step of withdrawing the third mobile apparatus 33 from connection; that is, when the third mobile apparatus 33 is disconnected and the user dedicated application is activated, the settings and dialog records when the third mobile apparatus 33 is connected to the car apparatus 3 will be downloaded to the third mobile apparatus 33.

The abovementioned step of connecting the car apparatus 3 to the third mobile apparatus 33 further includes a step of updating the version of the car apparatus 3; that is, the user dedicated application will remember the basic information that pairs with the car apparatus 3 (such as the UUID, the version numbers of all software and firmware), and when the third mobile apparatus 33 activates the user dedicated application, the third mobile apparatus 3 will return the version of the car apparatus 3 (i.e., the version numbers of all software and firmware of the car apparatus 3). The network server 1 will check whether the version of the car apparatus 3 (i.e., the version numbers of all software and firmware of the car apparatus 3) needs to be updated, and if the update is needed, then the network server 1 will push note a download message.

The abovementioned step of registering the car apparatus 3 further includes a step of comparing the plate number, comprising that (as shown in FIG. 7, FIG. 9 and FIG. 10):
a. The network server 1 will compare the plate number of the registration data. If the plate number is new, then the agency (can be an auto dealer) application will query whether a new subscriber is logged in. If the answer is "yes," then a new account will be opened and the account will record the registration data. If the answer is "no," then a message of "please confirm the plate number" is responded and the application ends (step 641) (In step 641, the network server 1 will compare the plate number of the registration data. If the plate number is new, then the agency (can be an auto dealer) dedicated application will query whether a new subscriber is logged in. If the answer is "yes," then a new account is opened and the account will record the registration data (including the serial number and all related data of the car apparatus, the warranty limit of the car apparatus, the expiration date of the navigation software, the UUID, the BLUETOOTH wireless technology standard location of each paired smart phone, the mileage to next service [computed by the navigation software]). If the answer is "no," then a message of "please confirm the plate number" is displayed and the application ends.)
b. If the plate number has been logged in already, then the UUID of the registration data is compared. If the comparison is true, then the time stamp of data will be compared and the difference will be synchronized. If the UUID is different, then the network server 1 will query "do you want to change to a new car apparatus?" If the answer is "yes," then it means a new car apparatus 3 is to be used and all the data will be synchronized. However, no data updating is done while setting up the car apparatus 3. If the answer is "no," then a message of "please confirm the plate number and the serial number of the car apparatus" is responded (step 642) (In step 642, if the plate number has been logged in already, then the UUID of the registration data is compared. If the comparison is true, then the time stamp of data is compared and the difference is synchronized. If the UUID is different, then the network server 1 will query "do you want to change to a new car apparatus?" If the answer is "yes," then it means that a new car apparatus 3 is to be used [breakdown maintenance] and all the data will be synchronized. However, no data updating is done while setting up the car apparatus 3 [such as the warranty limit, the free update time of the navigation maps, the free update time of the new navigation software, or the periodical maintenance like for every 10,000 miles or 6 months]. If the answer is "no," then a message of "please confirm the plate number and the serial number of the car apparatus" is responded.)

The abovementioned step of comparing the plate number can assure that even the car apparatus 3 is changed, the effect remains unchanged while setting up the car apparatus 3 or in the warranty limit.

Figure 12:
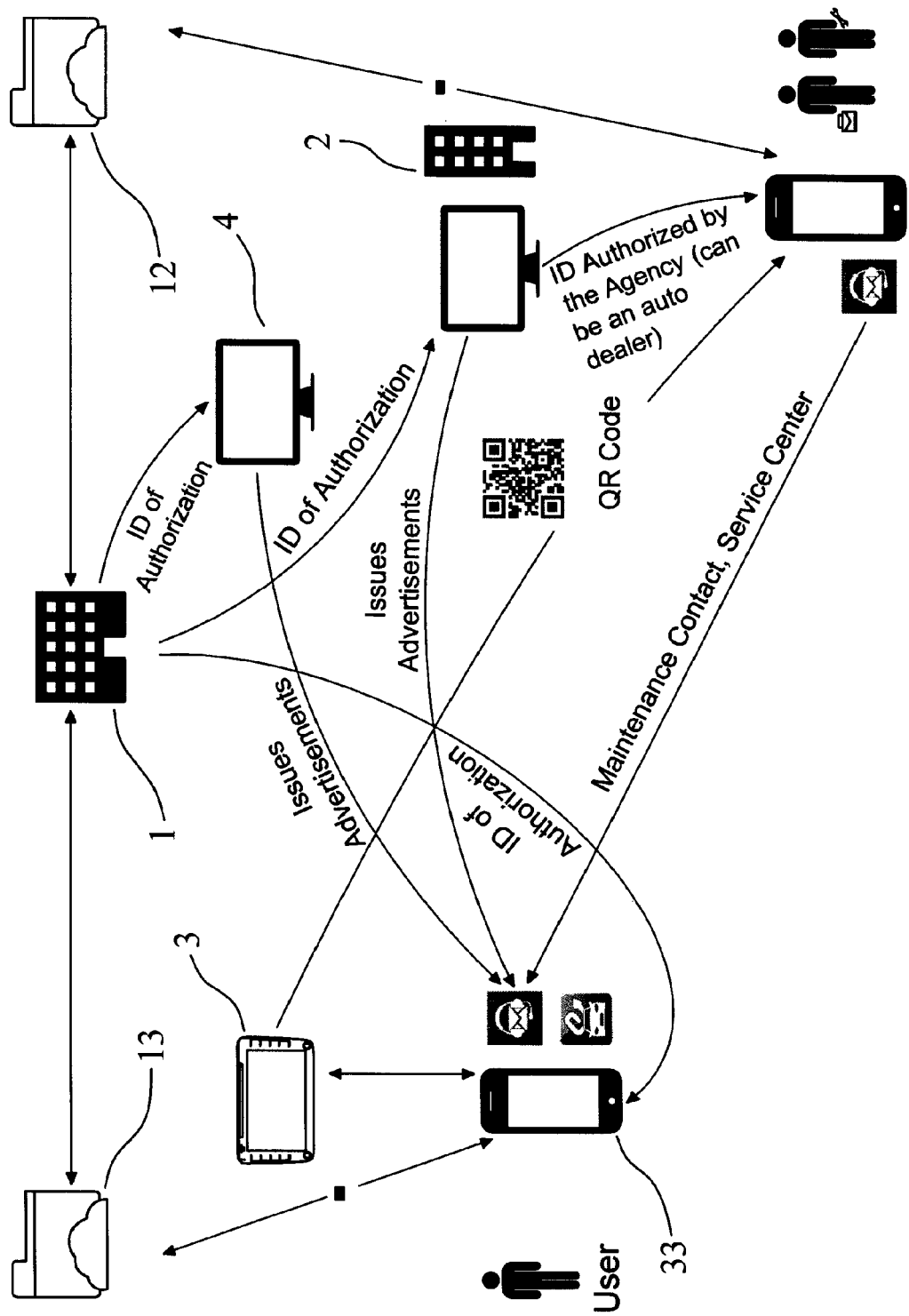
FIG. 12 shows a schematic view of an embodiment of a car factory of the present invention.

Referring to FIG. 12, the registration and connection method for the car apparatus and the mobile apparatus, according to the present invention, further includes a car factory 4. The car factory 4 can issue advertisements and notices to agencies (can be auto dealers) 2 owned by the car factory 4, as well as the third mobile apparatuses 33 associated with the car apparatuses 3 that are registered by the agencies (can be auto dealers) 2.

The abovementioned advertisements and notices are issued by the agencies (can be auto dealers) 2 to the third mobile apparatuses 33 associated with the car apparatuses 3 that are registered by the agencies (can be auto dealers) 2. The advertisements of repairing and maintenance managed by the agencies (can be auto dealers) 2 are based upon the plate numbers.

The abovementioned network server 1 issues the advertisements and notices to the third mobile apparatuses 33 associated with the car apparatuses 3 and all other mobile apparatuses on which the user dedicated application is installed.

The abovementioned network server 1 finds the account based upon the UUID or serial number of the car apparatus 3, and downloads the contact information of the agency (can be an auto dealer) 2 to the car apparatus 3. The contact information will be inputted in the agency (can be an auto dealer) page of the car apparatus 3. When the third mobile apparatus 33 activates the user dedicated application to pair with the car apparatus 3 using BLUETOOTH wireless technology standard, the data of the agency (can be an auto dealer) 2 will be imported in the agency (can be an auto dealer) page of the third mobile apparatus 33 for querying and contacting in the future.

The present invention is characterized in that the mobile apparatus registers the user dedicated application that is downloaded and registered by the mobile apparatus user, whereas the car apparatus should be registered by an agency (can be an auto dealer) using an agency (can be an auto dealer) dedicated application to upload the plate number and the registration data.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A registration and connection method for a car apparatus and a mobile apparatus, comprising following steps:
   (1) registration of a car apparatus, including that:
      a. a first agency applying for a first agency account from a network server; after confirmation and approval by the network server, a first agency webpage is opened on a website of the network server using the first agency account to input the basic information and the registration data of a plurality of car apparatuses, the first agency being a user registering the plurality of car apparatuses;
      b. the first agency inputting the registration data of the car apparatus in the first agency webpage of the network server, the registration data includes at least a serial number and a plate number of the car apparatus, and the registration data of the car apparatus is transmitted to the network server;

(2) registering a third mobile apparatus by installing a user dedicated application in the third mobile apparatus, the third mobile apparatus being a user mobile device, inputting and uploading the basic information of the third mobile apparatus to the network server utilizing the user dedicated application, the network server transmitting a message to the third mobile apparatus, the third mobile apparatus confirming the message and then utilizing the user dedicated application;

(3) connecting the car apparatus to the third mobile apparatus utilizing the user dedicated application, including that:
  a. installing a car dedicated application in a car apparatus; after the third mobile apparatus has been paired with the car apparatus using BLUETOOTH wireless technology standard, utilizing the user dedicated application and the car dedicated application to transmit the basic information of the third mobile apparatus and the car apparatus to each other; the third mobile apparatus obtains the basic information of the car apparatus, and the car apparatus obtains the basic information of the third mobile apparatus;
  b. after obtaining the basic information of the third mobile apparatus, the car apparatus transmits the basic information of the third mobile apparatus and the car apparatus to the network server, whereas the network server synchronizes the data of the third mobile apparatus with that of the car apparatus and converts the use right of the car dedicated application,
  wherein the step of registering the car apparatus further includes a step of changing the agency, comprising that:

(1) a second agency applying for a second agency account from a network server; after confirmation and approval by the network server, a second agency webpage is opened on a website of the network server using the second agency account to input the basic information and the registration data of the plurality of car apparatuses of the second agency, the second agency being a user registering the plurality of car apparatuses of the second agency;

(2) the second agency inputting the registration data of the car apparatus in the second agency webpage of the network server, and transmits the registration data of the car apparatus to the network server; and (3) the network server comparing the registration data, and queries whether a new agency is logged in; a screen of the car apparatus displays the pages of the first agency and the second agency and the car owner removes the second agency; the car apparatus notifies the first agency to display on the first agency webpage that the car owner is to remove the first agency and change to the second agency; if the first agency clicks to agree or does not respond in one month, then the first agency is replaced by the second agency.

2. The registration and connection method for a car apparatus and a mobile apparatus according to claim 1, wherein the first agency and the second agency transmitting an advertisement or a message of notification to the car apparatus and the third mobile apparatus.

3. The registration and connection method for a car apparatus and a mobile apparatus according to claim 1, wherein the network server pushing a message to the first agency or the second agency, the car apparatus, a first mobile apparatus and the third mobile apparatus, when the car apparatus reaches a specified time period.

4. The registration and connection method for a car apparatus and a mobile apparatus according to claim 1, wherein the step of connecting the car apparatus to the third mobile apparatus further includes a step of withdrawing the third mobile apparatus from connection that when the third mobile apparatus is disconnected and the user dedicated application is activated, the settings and dialog records when the third mobile apparatus is connected to the car apparatus are downloaded to the third mobile apparatus.

5. The registration and connection method for a car apparatus and a mobile apparatus according to claim 1, wherein the step of connecting the car apparatus to the third mobile apparatus further includes a step of updating the version of the car apparatus; that is, the user dedicated application remembers the basic information of the car apparatus, and when the third mobile apparatus activates the user dedicated application, the third mobile apparatus returns the basic information of the car apparatus and the network server checks whether the basic information of the car apparatus needs to be updated; if the basic information of the car apparatus needs to be updated, the network server pushes note a download message.

6. The registration and connection method for a car apparatus and a mobile apparatus according to claim 1, wherein the third mobile apparatus pairs with plural car apparatuses, and the car apparatus pairs with plural third mobile apparatuses.

7. The registration and connection method for a car apparatus and a mobile apparatus according to claim 1, wherein the step of registering the car apparatus further includes a step of comparing the plate number, comprising that:
  (1) the network server comparing the plate number of the registration data of the car apparatus to corresponding registration data located in the network server; if the plate number is new, then the agency dedicated application queries whether a new subscriber is logged in; if the answer is "yes," then a new account is opened and the account records the registration data, the registration is complete, and the application ends; if the answer is "no," then a message of "please confirm the plate number" is responded and the application ends; and
  (2) if the plate number has been logged in already, then the UUID (Universal Unique Identifier) of the registration data of the car apparatus is compared to the corresponding registration data located in the network server; if the comparison is true, then the time stamp data is compared to corresponding time stamp data located in the network server and the difference is synchronized; if the UUID is different, then the network server queries "do you want to change to a new car apparatus?"; if the answer is "yes," then it means that a new car apparatus is to be used and all the data are synchronized, except that no data updating is done while setting up the car apparatus; if the answer is "no," then a message of "please confirm the plate number and the serial number of the car apparatus" is responded.

8. A registration and connection method for a car apparatus and a mobile apparatus, comprising following steps:
  (1) registration of a car apparatus, including that:
    a. a first agency applying for a first agency account from a network server; after confirmation and approval by the network server, a first agency webpage is opened on a website of the network server using the first agency account to input the basic information, at least the data of one first service personnel, and the registration data of plural car apparatuses of the first agency;
b. installing an agency dedicated application in a first mobile apparatus, the first mobile device is a user mobile device; the basic information of the first service personnel are inputted and uploaded to the first agency webpage; after confirmation and approval by the first agency webpage, the first agency webpage transmitting a first activation message to the first mobile apparatus, and then the first mobile apparatus utilizing the agency dedicated application which contains a QR (Quick Response) code reader;
c. the first service personnel utilizing the QR code reader in the agency dedicated application of the first mobile apparatus to read the QR code of the car apparatus, and then a plate number field appears; the first service personnel inputting a plate number and then transmitting the registration data of the car apparatus to the network server;
(2) registering the third mobile apparatus by installing a user dedicated application in the third mobile apparatus and inputting and uploading the basic information of the third mobile apparatus to the network server utilizing the user dedicated application; the network server transmitting a message to the third mobile apparatus; after confirmation and approval by the third mobile apparatus, the third mobile apparatus utilizing the user dedicated application;
(3) connecting the car apparatus to the third mobile apparatus utilizing the user dedicated application, including that:
a. installing a car dedicated application in the car apparatus; after the third mobile apparatus has paired with the car apparatus using BLUETOOTH wireless technology standard, utilizing the user dedicated application and the car dedicated application to transmit the basic information of the third mobile apparatus and the car apparatus to each other; the third mobile apparatus obtains the basic information of the car apparatus, and the car apparatus obtains the basic information of the third mobile apparatus;
b. after obtaining the basic information of the third mobile apparatus, the car apparatus transmitting the basic information of the third mobile apparatus and the car apparatus to the network server; the network server synchronizes the data of the third mobile apparatus with that of the car apparatus, and converts the use right of the car dedicated application,
wherein the step of registering the car apparatus further includes a step of changing the agency, comprising that:
(1) a second agency applying for a second agency account from a network server; after confirmation and approval by the network server, a second agency webpage is opened on a website of the network server using the second agency account to input the basic information, at least the data of one second service personnel, and the registration data of plural car apparatuses of the second agency;
(2) installing an agency dedicated application in a second mobile apparatus, the second mobile device is a user mobile device; the basic information of the second service personnel are inputted and uploaded to the second agency webpage; after confirmation and approval by the second agency webpage, the second agency webpage transmits a second activation message to a second mobile apparatus, and the second mobile apparatus uses the agency dedicated application which includes a QR code reader;
(3) the second service personnel utilizing the QR code reader in the agency dedicated application of the second mobile apparatus to read the QR code of the car apparatus, and a plate number field appears; the second service personnel inputs the plate number and then transmits the registration data of the car apparatus to the network server; and
(4) the network server comparing the registration data and queries whether a new agency is logged in; a screen of the car apparatus displays the pages of the first agency and the second agency; the car owner removes the second agency, and the car apparatus notifies the first agency to display on the first agency webpage that the car owner is to remove the first agency and change to the second agency; if the first agency clicks to agree or does not respond in one month, then the first agency is replaced by the second agency.

9. The registration and connection method for a car apparatus and a mobile apparatus according to claim 8, wherein the first agency and the second agency transmitting an advertisement or a message of notification to the car apparatus and the third mobile apparatus.

10. The registration and connection method for a car apparatus and a mobile apparatus according to claim 8, wherein the network server pushing a message to the first agency or the second agency, the car apparatus, and the first, second and third mobile apparatuses, when the car apparatus reaching a specified time period.

11. The registration and connection method for a car apparatus and a mobile apparatus according to claim 8, wherein the step of connecting the car apparatus to the third mobile apparatus further includes a step of withdrawing the third mobile apparatus from connection, with that when the third mobile apparatus is disconnected and the user dedicated application is activated, the settings and dialog records when the third mobile apparatus is connected to the car apparatus are downloaded to the third mobile apparatus.

12. The registration and connection method for a car apparatus and a mobile apparatus according to claim 8, wherein the step of connecting the car apparatus to the third mobile apparatus further includes a step of updating the version of car apparatus, with that the user dedicated application remembers the basic information that pairs with the car apparatus, when the third mobile apparatus activates the user dedicated application, the third mobile apparatus returns the basic information of the car apparatus and the network server checks whether the basic information of the car apparatus needs to be updated; if the update is required, then the network server pushes note a download message.

13. The registration and connection method for a car apparatus and a mobile apparatus according to claim 8, wherein the third mobile apparatus pairs with plural car apparatuses, and the car apparatus pairs with plural third mobile apparatuses.

14. The registration and connection method for a car apparatus and a mobile apparatus according to claim 8, wherein the step of registering the car apparatus further includes a step of comparing the plate number, comprising that:
(1) the network server comparing the plate number of the registration data of the car apparatus to corresponding registration data located in the network server; if the plate number is new, then the agency dedicated application queries whether a new subscriber is logged in; if the answer is "yes," then a new account is opened and the account records the registration data, the registration is complete, and the application ends; if the answer is "no," then a message of "please confirm the plate number" is responded and the application ends; and (2) if the plate number has been logged in already, then the UUID of the registration data of the car apparatus is compared corresponding registration data located in the network server; if the comparison is true, then the time stamp data of the car apparatus is compared to corresponding time stamp data located in the network server and the difference is synchronized; if the UUID is different, then the network server queries whether to change to a new car apparatus; if the answer is "yes," it means that a new car apparatus is to be used, and all the data are synchronized, except that no data updating is done while setting up the car apparatus; if the answer is "no," then a message of "please confirm the plate number and the serial number of the car apparatus" is responded.

* * * * *